US011726518B2

(12) United States Patent
Saijo

(10) Patent No.: US 11,726,518 B2
(45) Date of Patent: Aug. 15, 2023

(54) OPERATING DEVICE

(71) Applicant: ALPS ALPINE CO., LTD., Tokyo (JP)

(72) Inventor: Takayuki Saijo, Miyagi (JP)

(73) Assignee: ALPS ALPINE CO., LTD., Tokyo (JP)

(*) Notice: Subject to any disclaimer, the term of this patent is extended or adjusted under 35 U.S.C. 154(b) by 49 days.

(21) Appl. No.: 17/456,611

(22) Filed: Nov. 26, 2021

(65) Prior Publication Data

US 2022/0083090 A1 Mar. 17, 2022

Related U.S. Application Data

(63) Continuation of application No. PCT/JP2020/010607, filed on Mar. 11, 2020.

(30) Foreign Application Priority Data

Jun. 20, 2019 (JP) .................................. 2019-114962

(51) Int. Cl.
*G05G 1/04* (2006.01)
*B60N 2/02* (2006.01)

(52) U.S. Cl.
CPC .............. *G05G 1/04* (2013.01); *B60N 2/0228* (2013.01)

(58) Field of Classification Search
None
See application file for complete search history.

(56) References Cited

U.S. PATENT DOCUMENTS 3,223,791 A * 12/1965 Wanlass ................. H01H 35/00
200/557
5,844,182 A * 12/1998 Hirano ................ B60N 2/0228
200/18
6,252,183 B1 * 6/2001 Shirai .................... H01H 25/00
200/18

(Continued)

FOREIGN PATENT DOCUMENTS

JP S53-131578 U 10/1978
JP S57-101314 6/1982

(Continued)

OTHER PUBLICATIONS

International Search Report for PCT/JP2020/010607 dated May 26, 2020.

*Primary Examiner* — Vicky A Johnson
(74) *Attorney, Agent, or Firm* — IPUSA, PLLC

(57) ABSTRACT

An operating device includes a control knob, an actuator, a first switch, a second switch, and a holder. An accommodating space of the holder is defined by a first accommodating portion extending in a first direction. A first arm is accommodated in a first accommodating portion. A second arm is accommodated in a second accommodating portion. The first arm or the first accommodating portion includes an allowance portion that allows for tilting of the actuator in the second direction, without interference between the first arm and the first accommodating portion. The second arm or the second accommodating portion includes an allowance portion that allows for tilting of the actuator in the first direction, without interference between the second arm and the second accommodating portion.

8 Claims, 17 Drawing Sheets

(56) References Cited

U.S. PATENT DOCUMENTS

| | | | |
|---|---|---|---|
| 6,403,898 B2* | 6/2002 | Janniere | G05G 9/047 |
| | | | 200/6 A |
| 7,525,052 B2* | 4/2009 | Novelle | B60N 2/0228 |
| | | | 200/5 R |
| 2010/0258424 A1 | 10/2010 | Ui et al. | |
| 2018/0105068 A1 | 4/2018 | Takayanagi | |

FOREIGN PATENT DOCUMENTS

| | | |
|---|---|---|
| JP | H06-076694 | 3/1994 |
| JP | 2004-288393 | 10/2004 |
| JP | 2012-123923 | 6/2012 |
| JP | 5241587 | 7/2013 |
| JP | 2016-029645 | 3/2016 |
| JP | 2016-213120 | 12/2016 |
| JP | 2018-067446 | 4/2018 |

\* cited by examiner

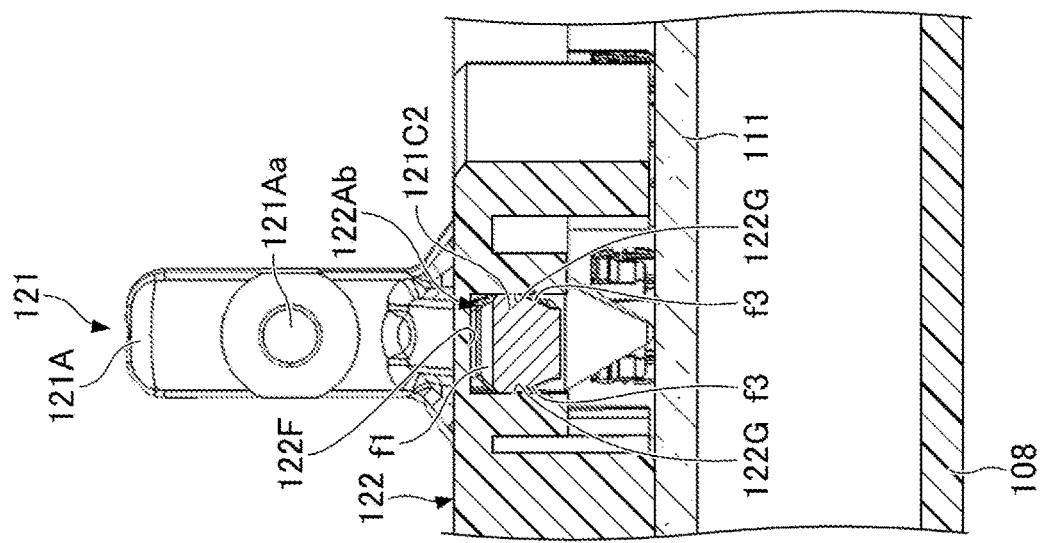
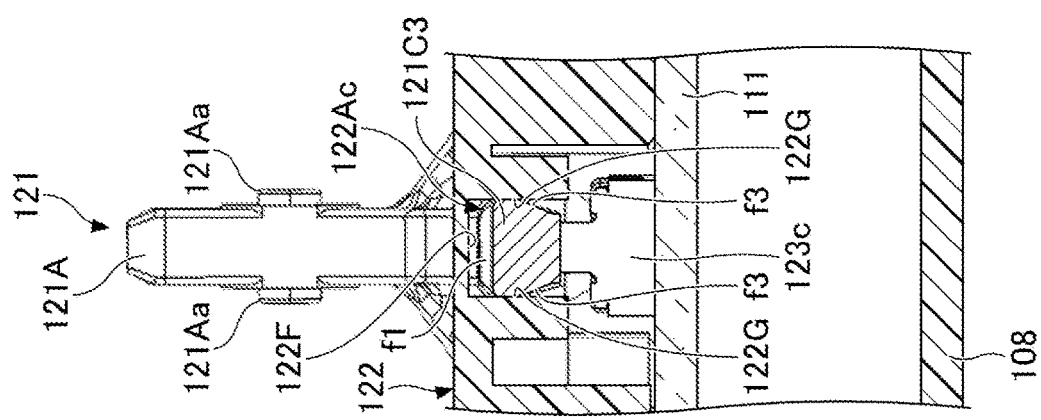
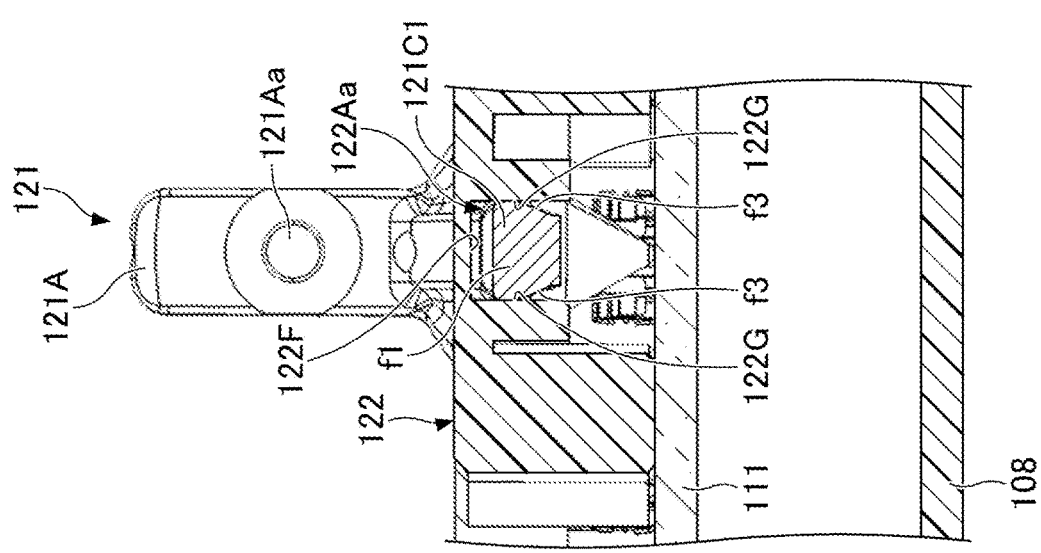

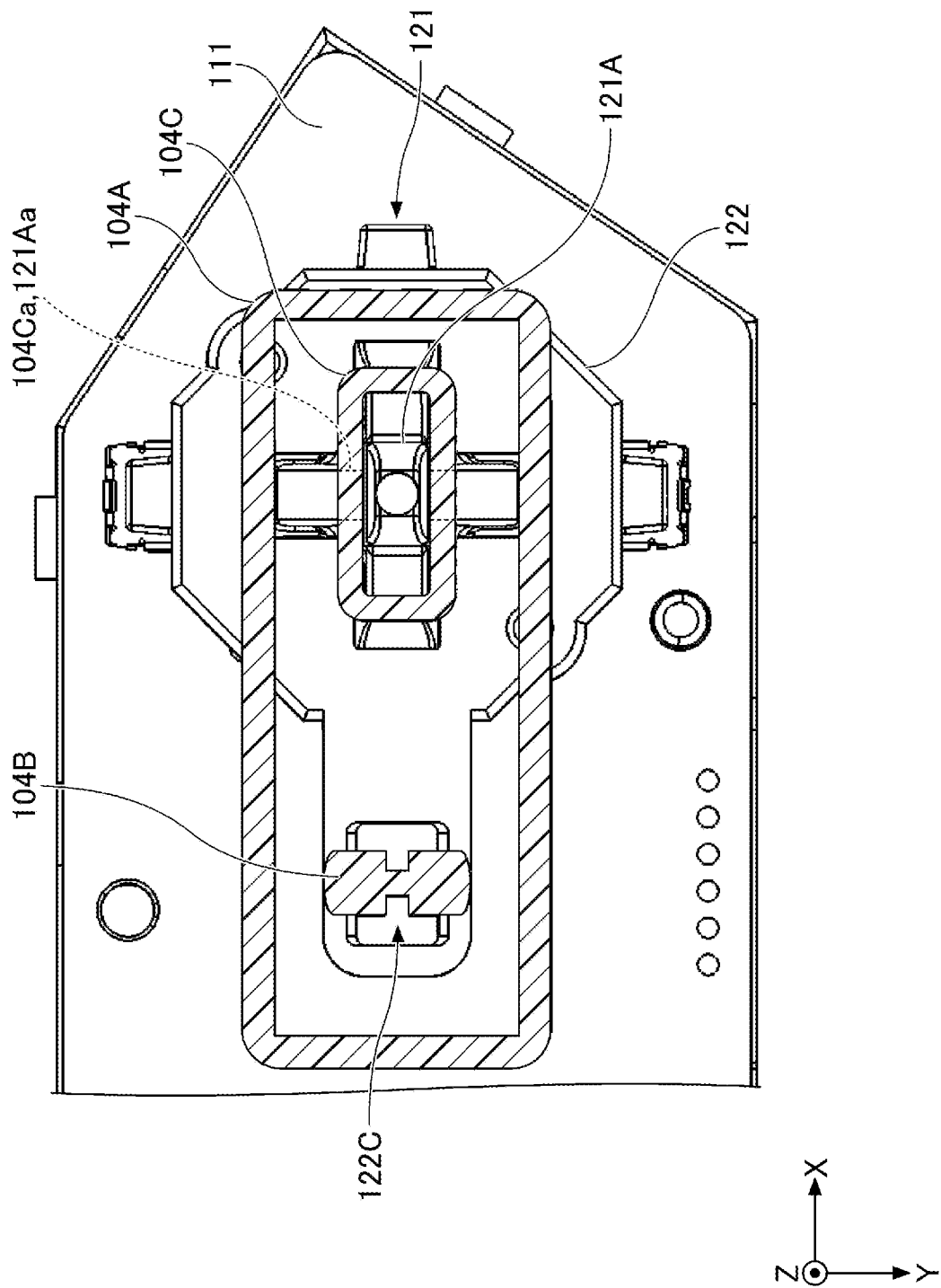

OPERATING DEVICE

CROSS-REFERENCE TO RELATED APPLICATION

This application is a continuation application of International Application No. PCT/JP2020/010607 filed on Mar. 11, 2020, and designated the U.S., which is based upon and claims priority to Japanese Patent Application No. 2019-114962, filed on Jun. 20, 2019. The entire contents of which are incorporated herein by reference.

BACKGROUND

1. Field of the Invention

The present disclosure relates to an operating device.

2. Description of the Related Art

In various operating devices such as power seat switches for a vehicle, techniques have been proposed in which a control knob is coupled to an actuator to perform a switch operation and the actuator can perform the switch operation by manipulation of the control knob through a user.

For example, Patent Document 1 below relates to a slide switch structure for a power seat switch to disclose a technique that slides a slider coupled to a knob by a rotation manipulation of the knob.

Patent Document 2 below relates to a power seat switch device for a vehicle to disclose a technique that holds a spherical engagement portion at a distal end of a drive body, by using an engagement-holding portion (two engagement-holding plates arranged in parallel) provided in a control knob.

CITATION LIST

Patent Document

[Patent Document 1] Japanese Patent No. 5241587
[Patent Document 2] Japanese Unexamined Patent Application Publication No. 2004-288393

Unfortunately, in conventional techniques, if there is a space between members (e.g., between a control knob and an actuator) connected to each other, due to manufacture variances or the like, rattling between the members may occur, and consequently a smooth and direct manipulation feel may not be provided.

In conventional techniques, if the space between the members connected to each other is entirely removed, frictional resistance between the members increases, or a positional difference between the members cannot be tolerable, thereby resulting in the occurrence of twisting. Therefore, a smooth and direct manipulation feel may fail to be provided.

An operating device according to one embodiment includes a control knob provided extending in a first direction, one side of the control knob in the first direction being pivotally supported to be rotatable about a shaft that protrudes substantially perpendicular to the first direction, and another side of the control knob in the first direction being rotatable. The operating device includes an actuator including a spherical portion, rotation of the control knob causing the actuator to tilt in a second direction perpendicular to the first direction, such that the center of the spherical portion serves as a fulcrum, and sliding of the control knob in the first direction causing the actuator to tilt in first direction, such that the center of the spherical portion serves as the fulcrum. The operating device includes a first switch configured to be depressed in accordance with the tilting of the actuator in the first direction. The operating device includes a second switch configured to be depressed in accordance with the tilting of the actuator in the second direction. The operating device includes a holder having an accommodating space defined by the outer periphery of the actuator, the holder holding the actuator within the accommodation space. The actuator includes a first arm extending from the spherical portion in the first direction, the first arm being configured to depress the first switch in accordance with the tilting of the actuator in the first direction. The operating device includes a second arm extending from the spherical portion in the second direction, the second arm being configured to depress the second switch in accordance with the tilting of the actuator in the second direction. The operating device includes a columnar portion protruding from the spherical portion in a third direction perpendicular to each of the first direction and the second direction. The accommodating space of the holder is defined by a first accommodating portion extending in the first direction, the first arm being accommodated in the first accommodating portion, and the first accommodating portion being configured to guide the first arm in a depression direction of the first switch. The accommodating space of the holder is defined by a second accommodating portion extending in the second direction, the second arm being accommodated in the second accommodating portion, and the second accommodating portion being configured to guide the second arm in a depression direction of the second switch. The first arm or the first accommodating portion includes an allowance portion that allows the tilting of the actuator in the second direction, without interference between the first arm and the first accommodating portion. The second arm or the second accommodating portion includes an allowance portion that allows the tilting of the actuator in the first direction, without interference between the second arm and the second accommodating portion.

Effects of the Disclosure

According to one embodiment, an operating device that provides a smooth and direct manipulation feel can be provided.

BRIEF DESCRIPTION OF THE DRAWINGS

FIGS. 13A to 13C are cross-sectional views of arms arranged during non-manipulation of the actuator illustrated in FIG. 12;

FIG. 15 is a cross-sectional view of the switch module taken along the F-F line illustrated in FIG. 9;

DESCRIPTION OF THE EMBODIMENTS

Figure 1:
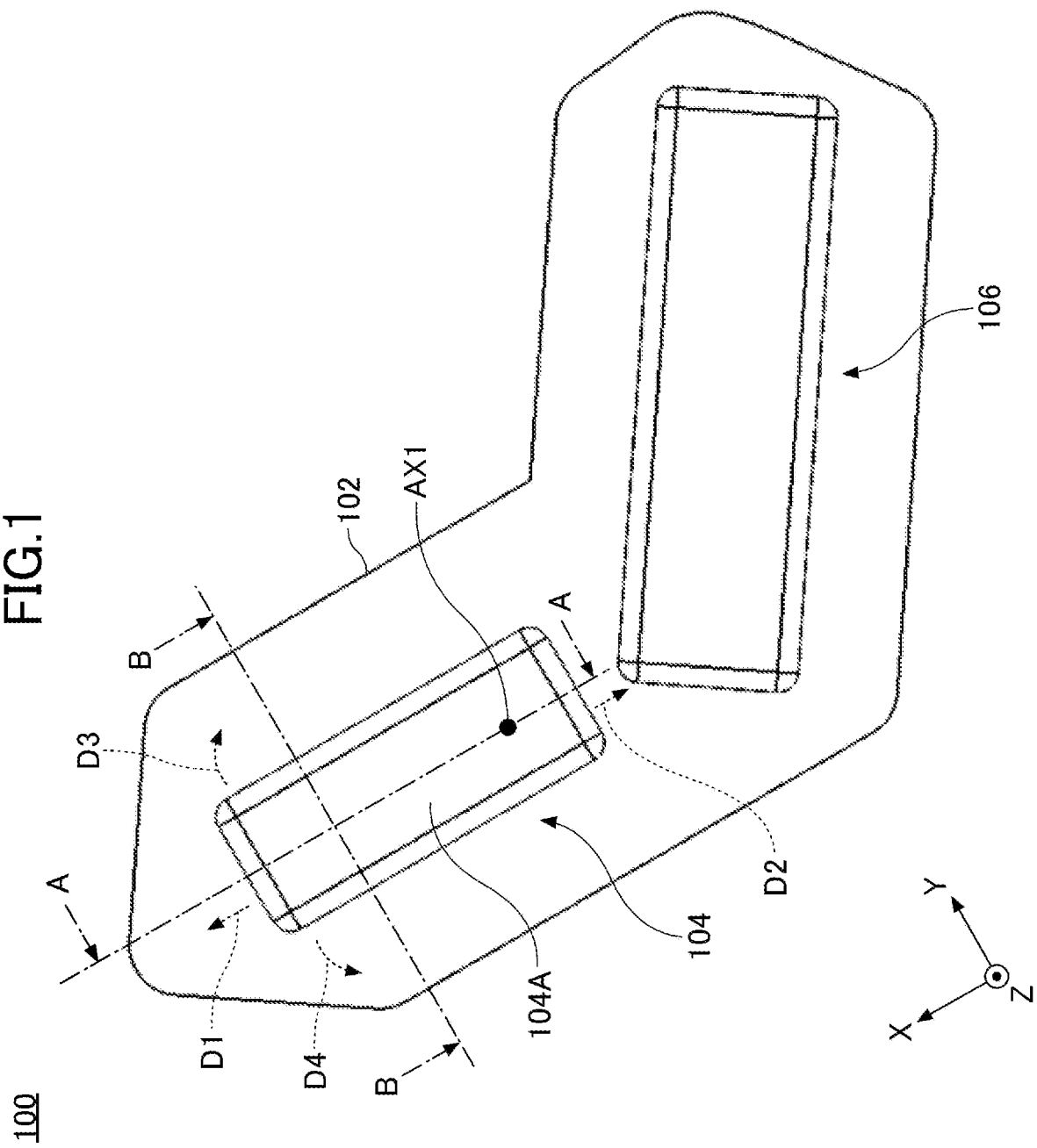
FIG. 1 is a plan view of a power seat switch according to one embodiment.

One embodiment will be described below with reference to the drawings. In the following description, for the purpose for convenience, a Z-axis direction (which is an example of a "third direction") in the drawings is referred to as a vertical direction, a positive Z-axis direction in the drawings is referred to as an upward direction, and a negative Z-axis direction in the drawings is referred to as a downward direction. The X-axis direction in the drawings is an example of a "first direction", and a Y-axis direction in the drawings is an example of a "second direction".

(Outline of Power Seat Switch 100)

FIG. 1 is a plan view of a power seat switch 100 according to one embodiment. The power seat switch 100 illustrated in FIG. 1 is an example of a "controller" recited in the claims, and is a device for operating a power seat for a vehicle. For example, the power seat switch 100 is provided at a predetermined location (e.g., an inner panel of a door, a seat surface side of a seat, or the like) of the vehicle.

As illustrated in FIG. 1, the power seat switch 100 includes a case 102, a control knob 104, and a control knob 106. The control knob 104 and the control knob 106 are provided on the upper surface of the case 102. The control knob 104 and the control knob 106 are operating members with which a switch operation (e.g., a depression manipulation, a slide manipulation, or a tilt manipulation) for various adjustments (e.g., reclining adjustment, height adjustment, tilt adjustment, and positioning for fore-and-aft positions) is performed for the power seat.

The control knob 104 includes a cuboid control portion 104A of which the longitudinal direction is the X-axis direction in the figure. By the slide manipulation of the control portion 104A through a user, the control knob 104 can slide in both a positive X-axis direction (direction D1 in the figure) and a negative X-axis direction (direction D2 in the figure), as viewed from above.

The control knob 104 includes a shaft 104B (see FIG. 2) extending downwardly from the control portion 104A, in the negative Z-axis direction in the figure.

The control knob 104 also includes a coupling portion 104C (see FIG. 2) extending downwardly from the control portion 104A, in the positive Z-axis direction.

By a rotation manipulation of the control portion 104A through the user, an X-axis side-portion of the control knob 104 is rotatable about a central axis AX1 of the shaft 104B as a rotation axis, in each of a clockwise direction (direction D3 in the figure) and a counterclockwise direction (direction D4 in the figure), as viewed from above.

The power seat switch 100 is electrically connected to a control unit (not illustrated) provided in the vehicle, via a connection member (not illustrated) such as a connector or a cable. With this arrangement, the power seat switch 100 outputs, to the control unit, an electrical signal through the switch operation performed using each of the control knob 104 and the control knob 106 to thereby enable the control unit to control the power seat.

(Configuration of Power Seat Switch 100)

Figure 2:
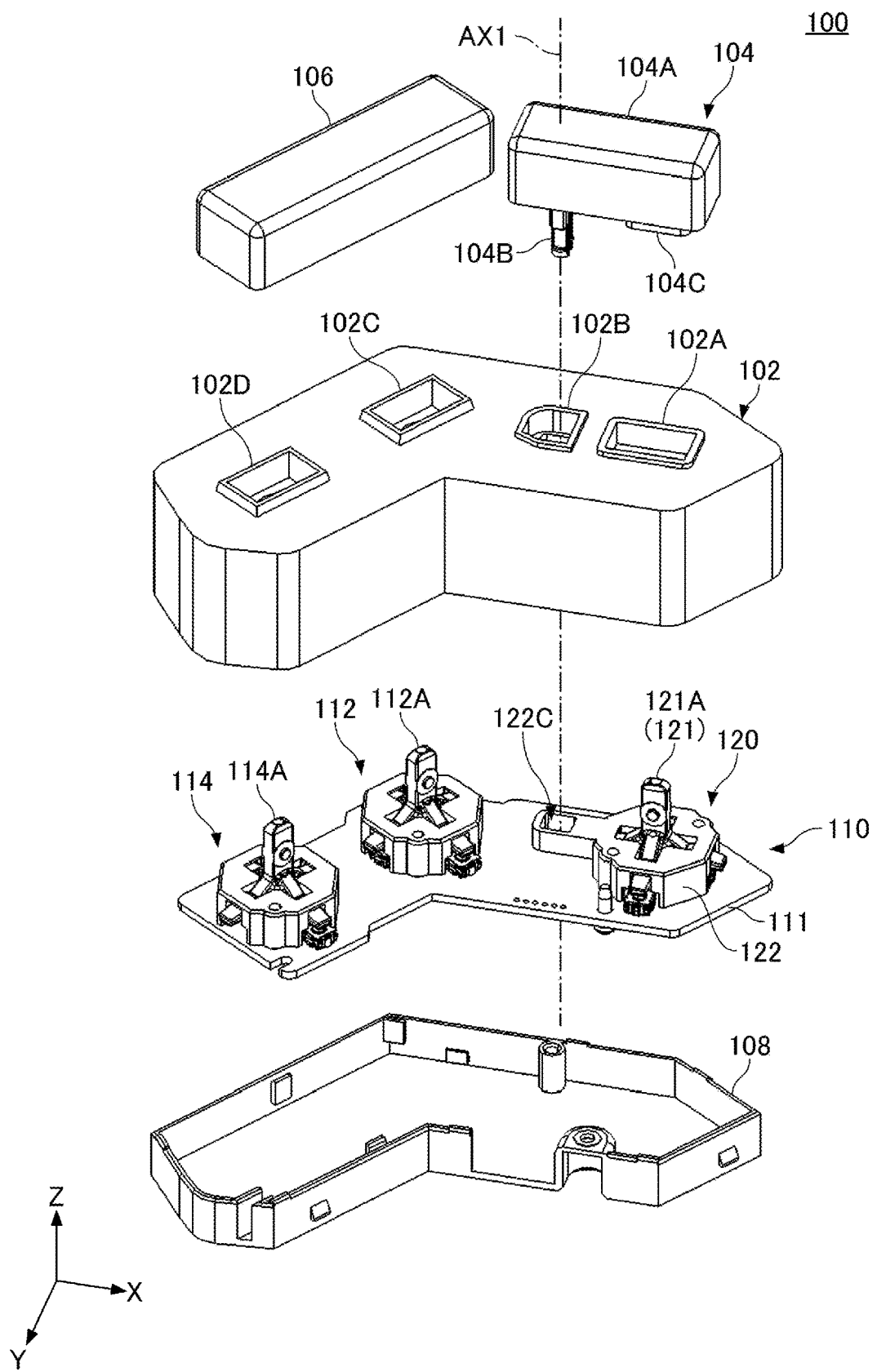
FIG. 2 is an exploded perspective view of the power seat switch according to one embodiment.

FIG. 2 is an exploded perspective view of the power seat switch 100 according to one embodiment. As illustrated in FIG. 2, the power seat switch 100 is configured to include the control knob 104, the control knob 106, the case 102, a substrate unit 110, and a cover 108 that are arranged in this order from above.

The case 102 is a container-like member having an internal space and a lower opening of the case on the lower side. For example, the case 102 is formed by injection molding of a resin material. As described in FIG. 1, the control knob 104 and the control knob 106 are provided on the top surface of the case 102. The lower opening of the case 102 is closed by attachment of the cover 108. The substrate unit 110 is accommodated in the internal space of the case 102.

The substrate unit 110 is configured such that three switch modules 112, 114, and 120 are provided on the top surface of a substrate 111 that is a flat plate.

The switch modules 112 and 114 respectively include actuators 112A and 114A each including a columnar portion that extends upwardly. The respective columnar portions in the actuators 112A and 114A are each coupled to the control knob 106, through an opening among openings 102C and 102D formed in the case 102. With this arrangement, in each of the switch modules 112 and 114, the switch operation can be performed through the control knob 106.

The switch module 120 includes an actuator 121 including a columnar portion 121A that extends upwardly. The columnar portion 121A of the actuator 121 is coupled to the coupling portion 104C of the control knob 104 through an opening 102A formed at the top of the case 102. The columnar portion 121A supports the coupling portion 104C. With this arrangement, in the switch module 120, the actuator 121 can depress a corresponding switch (any one of switches 123a to 123d. See FIG. 3), in response to the slide manipulation or the rotation manipulation of the control knob 104.

The shaft 104B of the control knob 104 is fitted into a shaft-receiving hole 122C via an opening 102B formed at the top of the case 102, where the shaft-receiving hole 122C is integrally formed in a holder 122 provided in the switch module 120. With this arrangement, the control knob 104 is pivotally supported by the holder 122 so as to be rotatable.

(Configuration of Switch Module 120)

Figure 3:
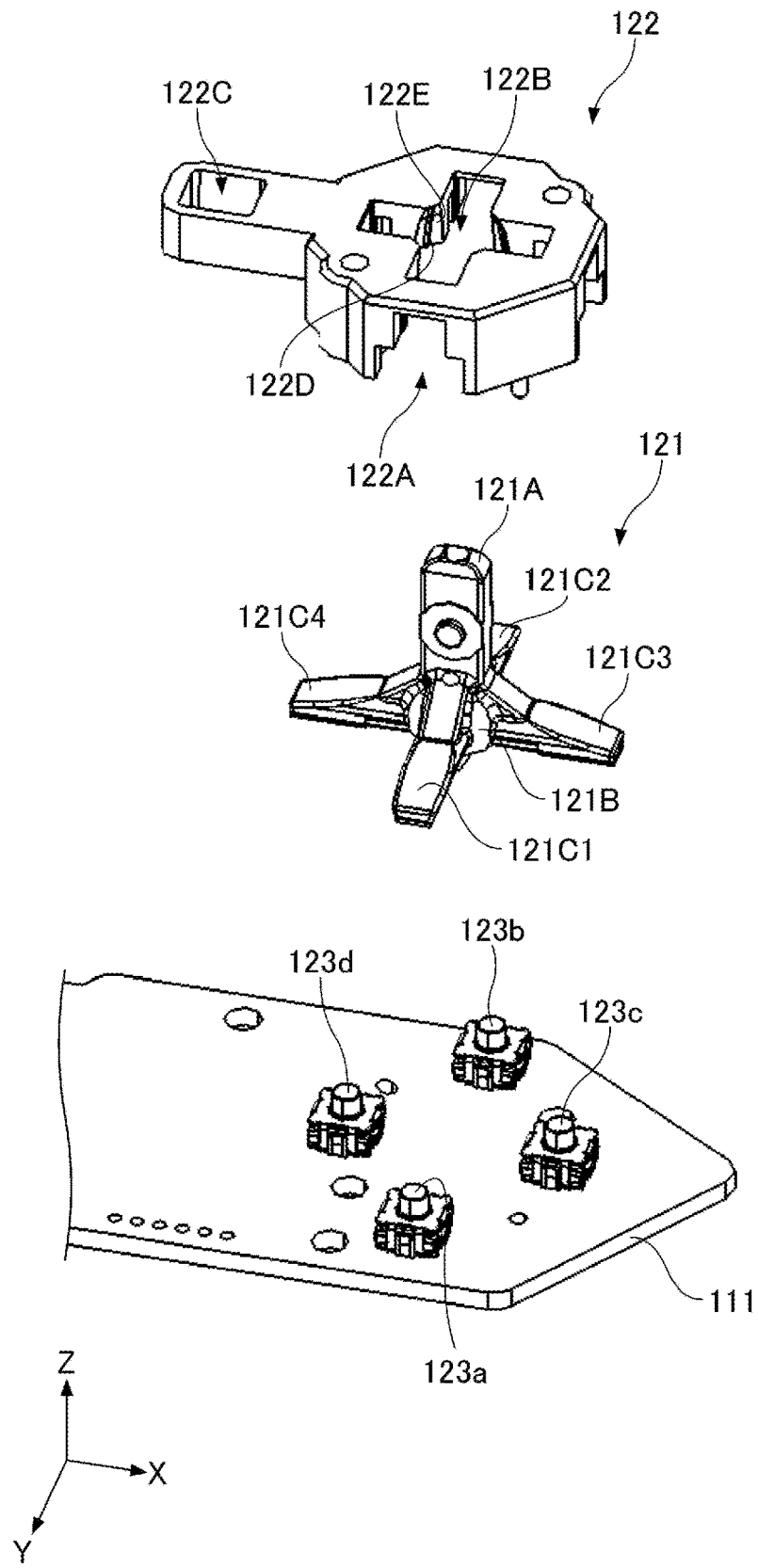
FIG. 3 is a diagram illustrating the configuration of a switch module provided in the power seat switch according to one embodiment.

FIG. 3 is a diagram illustrating the configuration of the switch module 120 provided in the power seat switch 100 according to one embodiment. As illustrated in FIG. 3, the switch module 120 includes the actuator 121, the holder 122, and the switches 123a, 123b, 123c, and 123d.

The actuator 121 has the columnar portion 121A, a spherical portion 121B, and arms 121C1, 121C2, 121C3, and 121C4. The columnar portion 121A extends vertically from the center of the actuator 121. The columnar portion 121A protrudes substantially perpendicularly from the spherical portion 121B. The spherical portion 121B is pushed upward by a restoring force of a given switch among the switches 123a to 123d, where the restoring force is transmitted through a corresponding arm among the arms 121C1 to 121C4. With this arrangement, the spherical portion 121B is pressed into a given curved portion among curved portions 122E of the holder 122. The spherical portion 121B rotates in accordance with tilting of the columnar portion 121A, while sliding with respect to a given rib among four ribs 122D that is formed at the respective curved portions 122E of the holder 122.

Each of the arms 121C1 and 121C2 is an example of a "second arm" recited in the claims. The arm 121C1 extends from the spherical portion 121B in the positive Y-axis direction. The arm 121C2 extends from the spherical portion 121B in the negative Y-axis direction.

Each of the arms 121C3 and 121C4 is an example of a "first arm" recited in the claims. The arm 121C3 extends from the spherical portion 121B in the positive X-axis direction. The arm 121C4 extends from the spherical portion 121B in the negative X-axis direction.

The actuator 121 is tilted in the Y-axis direction in accordance with the rotation of the control knob 104, where the center 121Ba of the spherical portion 121B serves as a fulcrum. The actuator 121 is tilted in the X-axis direction in accordance with the slide of the control knob 104 in the X-axis direction, where the center 121Ba of the spherical portion 121B serves as a fulcrum.

Each of the switches 123a and 123b is an example of a "second switch" recited in the claims. The switch 123a is disposed on the upper surface of the substrate 111, under the arm 121C1. When the rotation manipulation of the control knob 104 is performed in the positive Y-axis direction, the actuator 121 is tilted in the positive Y-axis direction, and thus the switch 123a is depressed from above, by the arm 121C1.

The switch 123b is disposed on the top surface of the substrate 111, under the arm 121C2. When the rotation manipulation of the control knob 104 is performed in the negative Y-axis direction, the actuator 121 is tilted in the negative Y-axis direction, and thus the switch 123b is depressed from above, by the arm 121C2.

Each of the switches 123c and 123d is an example of a "first switch" recited in the claims. The switch 123c is disposed on the top surface of the substrate 111, under the arm 121C3. When the slide manipulation of the control knob 104 is performed in the positive X-axis direction, the actuator 121 is tilted in the positive X-axis direction, and thus the switch 123c is depressed from above, by the arm 121C3.

The switch 123d is disposed on the top surface of the substrate 111, under the arm 121C4. When the slide manipulation of the control knob 104 is performed in the negative X-axis direction, the actuator 121 is tilted in the negative X-axis direction, and thus the switch 123d is depressed from above, by the arm 121C4.

Each of the switches 123a, 123b, 123c, and 123d is, for example, a metal contact switch that can provide a clicking sensation.

The holder 122 is attached to the top surface of the substrate 111 and is secured by one or more securing portions such as screws. The holder 122 has an accommodating space 122A, the opening 122B, the shaft-receiving hole 122C, the curved portions 122E, and the ribs 122D.

A portion (including the arms 121C1, 121C2, 121C3, 121C4) of the actuator 121 at the lower side, as well as the switches 123a, 123b, 123c, and 123d, are accommodated in the accommodating space 122A. The accommodating space 122A is shaped to conform to the outer periphery of the actuator 121, and the actuator 121 is held within the accommodating space 122A.

The opening 122B is formed in a cross-shape at the top of the holder 122. The opening 122B exposes a portion (including the columnar portion 121A) of the actuator 121 at the upper side, from the top of the holder 122.

The shaft-receiving hole 122C is provided on the negative X-axis side at a predetermined distance from the accommodating space 122A. The shaft 104B is rotatably supported at the shaft-receiving hole 122C, in a state in which the shaft 104B of the control knob 104 passes through the shaft-receiving hole 122C. The shaft-receiving hole 122C has an elongated hole shape extending in the X-axis direction. With this arrangement, the shaft-receiving hole 122C allows for the movement of the shaft 104B in the X-axis direction.

At the top of the holder 122, the curved portions 122E are formed at each of four corners disposed at the middle portion of the opening 122B. Each curved portion 122E is curved along the surface of the spherical portion 121B of the actuator 121. The ribs 122D are formed at each of the four curved portions 122E of the holder 122 that are provided at the top of the holder 122. The ribs 122D are in sliding contact with the surface of the spherical portion 121B of the actuator 121.

Figure 4:
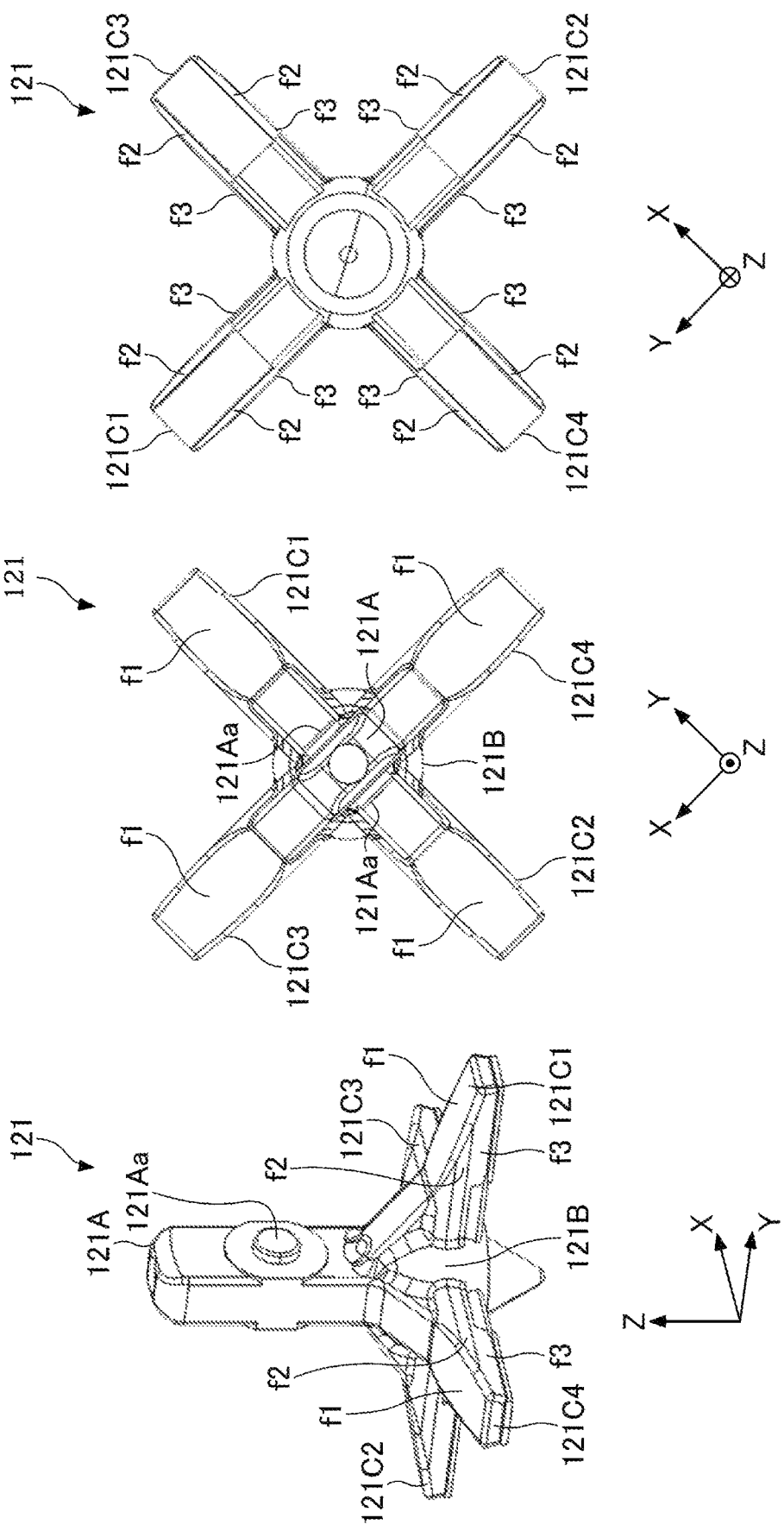
FIGS. 4A to 4C are diagrams illustrating the configuration of an actuator provided in the power seat switch according to one embodiment.
Figure 5:
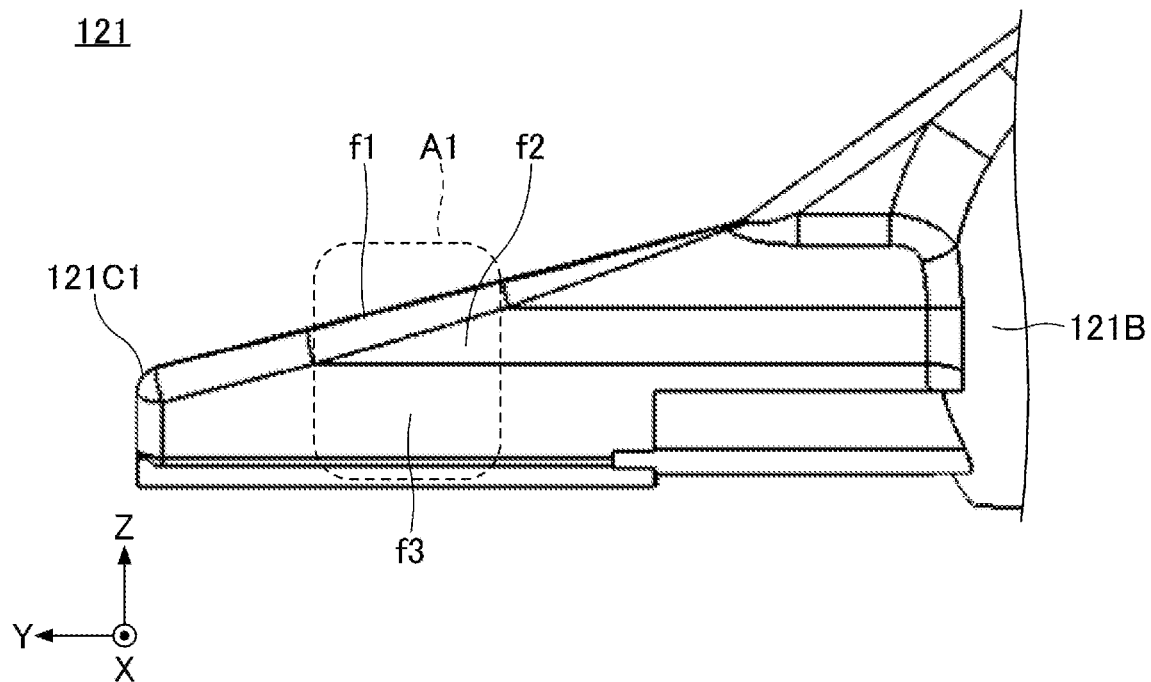
FIG. 5 is a partially enlarged view of the actuator provided in the power seat switch according to one embodiment.
Figure 6A:
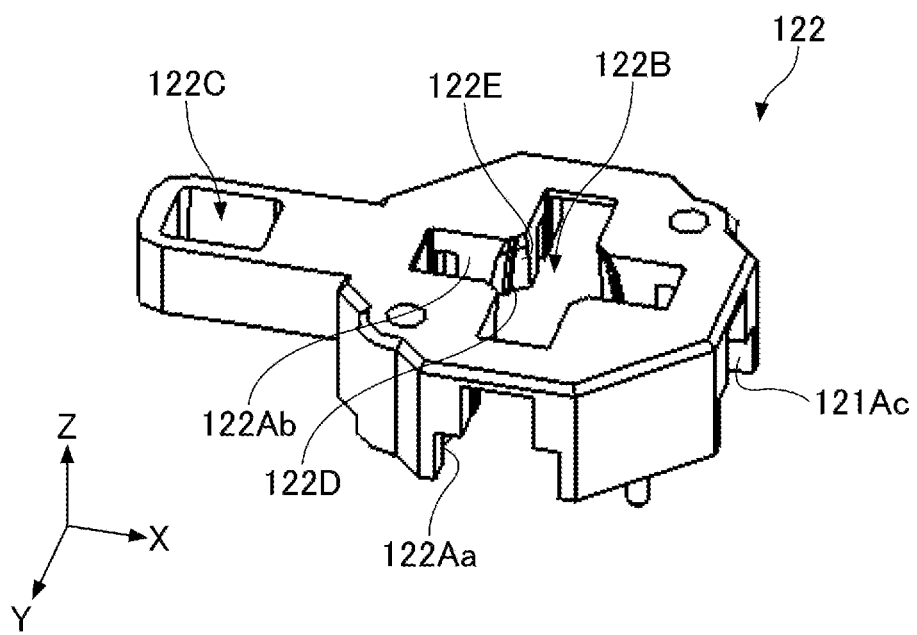
FIGS. 6A to 6C are diagrams illustrating the configuration of a holder provided in the power seat switch according to one embodiment.
Figure 6B:
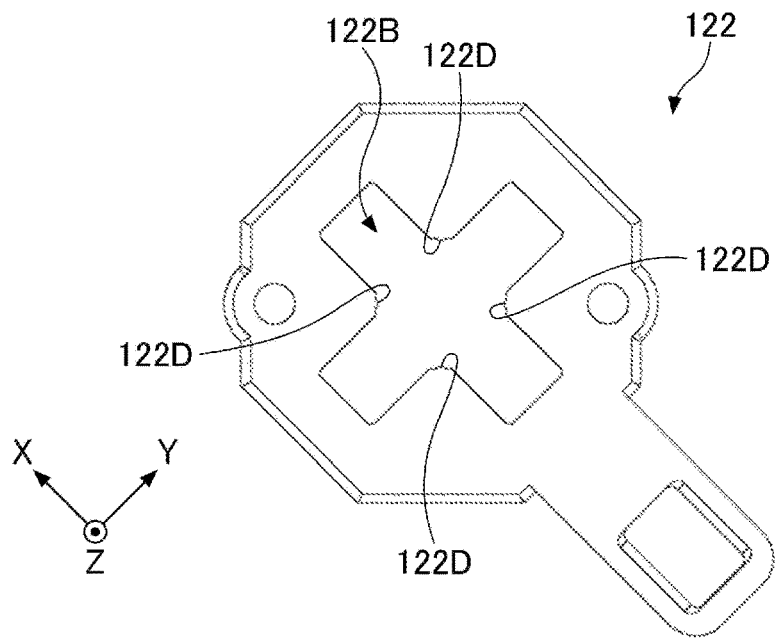
Figure 6C:
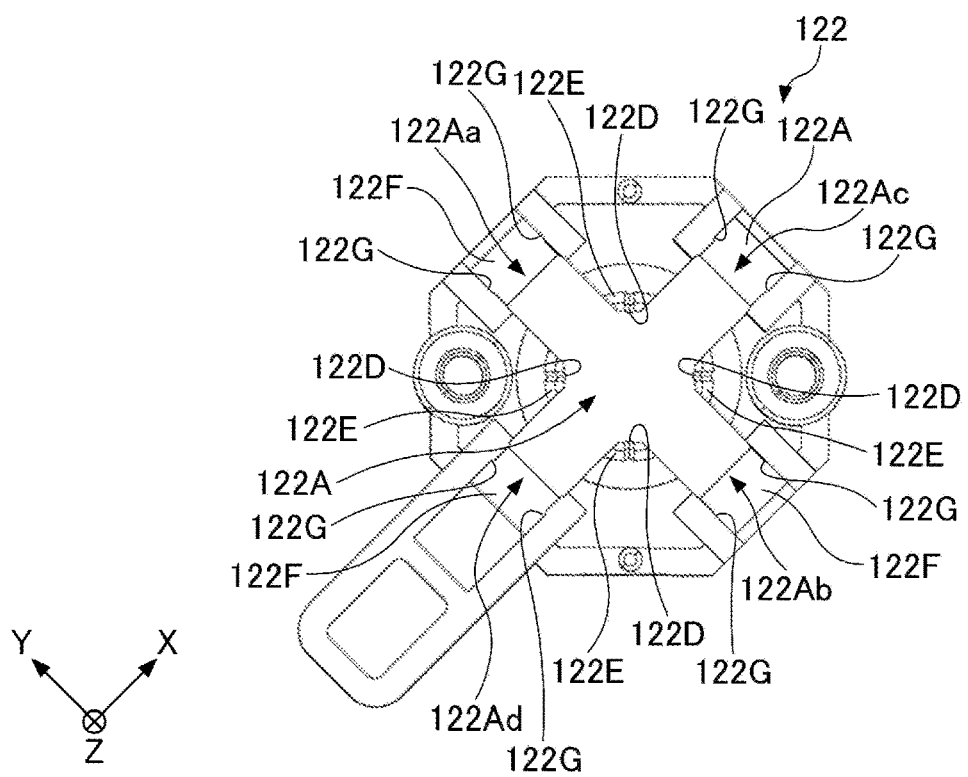

FIG. 4 is a diagram illustrating the configuration of the actuator 121 provided in the power seat switch 100 according to one embodiment. FIG. 4A is a perspective view of the actuator 121. FIG. 4B is a plan view of the actuator 121. FIG. 4C is a bottom view of the actuator 121. FIG. 5 is a partially enlarged view of the actuator 121 provided in the power seat switch 100 according to one embodiment. FIGS. 6A to 6C are diagrams illustrating the configuration of the holder 122 provided in the power seat switch 100 according to one embodiment. FIG. 6A is a perspective view of the holder 122. FIG. 6B is a plan view of the holder 122. FIG. 6C is a bottom view of the holder 122.

As illustrated in FIG. 4, each of the arms 121C1 to 121C4 provided in the actuator 121 has the same shape. Also, as illustrated in FIG. 4 and FIG. 5, each of the arms 121C1 to 121C4 has a contact surface f1, sliding curved surfaces f2, and tapered surfaces f3. The contact surface f1, a given sliding curved surface f2, and a given tapered surface f3 are each configured in the region A1 illustrated in FIG. 5 to be able to be in contact with or in sliding contact with a given accommodating portion among the accommodating portions (122Aa to 122Ad) of the holder 122 illustrated in FIGS. 6A to 6C.

The contact surface f1 is a planar portion formed at the top of each of the arms 121C1 to 121C4. The contact surface f1 is a surface that is sloped downward toward a distal end of each of the arms 121C1 to 121C4. When the actuator 121 is tilted in a direction to any one of the arms, the contact surface f1 of a given arm situated in an opposite direction of the one arm contacts a given ceiling surface 122F (see FIG. 6C) that is planarly provided above a corresponding accommodating portion among the accommodating portions (122Aa to 122Ad) and is oriented downward so as to correspond to the contact surface f1, where the given ceiling surface is at the top of the corresponding accommodating portion (122Aa to 122Ad) of the holder 122 illustrated in FIG. 6. With this arrangement, a tilt angle is limited.

The sliding curved surfaces f2 are curved portions that are respectively formed on both sides of each of the arms 121C1 to 121C4. In accordance with the tilt (tilting in a direction intersecting with a given arm having sliding curved surfaces f2) of the actuator 121, each sliding curved surface f2 of the actuator 121 is in sliding contact with an inner wall surface 122G (see FIG. 6C) of a corresponding accommodating portion among the accommodating portion (122Aa to 122Ad) of the holder 122.

Each tapered surface f3 is an example of an "allowance portion" recited in the claims. The tapered surfaces f3 are planar portions that are formed at both sides of each of the arms 121C1 to 121C4, where each tapered surface f3 is under a corresponding sliding curved surface f2. The tapered surface f3 is a surface that is sloped such that the width of a corresponding arm decreases toward the lower side of the tapered surface. Each tapered surface f3 allows for the tilt (tilt in a direction intersecting with a given arm having given tapered surfaces f3) of the actuator 121, without interference between a given tapered surface and the inner wall surface 122G of a given accommodating portion among the accommodating portions (122Aa to 122Ad) of the holder 122 in which the given arm is accommodated.

As illustrated in FIG. 4, cylindrical protrusions 121Aa protrude from both side surfaces of the columnar portion 121A of the actuator 121, in the Y-axis direction. The protrusions 121Aa are fitted into shaft-receiving holes 104Ca that are circular and are formed in the coupling portion 104C of the control knob 104. With this arrangement, the actuator 121 can pivotally support the coupling portion 104C such that the coupling portion is rotatable.

As illustrated in FIG. 6C, accommodating portions 122Aa, 122Ab, 122Ac, and 122Ad arranged in a cross pattern are formed under the upper wall of the holder 122.

Each of the accommodating portions 122Aa and 122Ab is an example of a "second accommodating portion" recited in the claims. The accommodating portion 122Aa is a space extending linearly in the positive Y-axis direction, from the center of the accommodating space 122A (portion in which the spherical portion 121B is accommodated). The arm 121C1 of the actuator 121 extending linearly in the positive Y-axis direction, as well as the switch 123a that is disposed under the arm 121C1 and on the substrate 111, are accommodated in the accommodating portion 122Aa.

The accommodating portion 122Ab is a space extending linearly in the negative Y-axis direction, from the center of the accommodating space 122A. The arm 121C2 of the actuator 121 extending linearly in the negative Y-axis direction, as well as the switch 123b that is disposed under the arm 121C2 and on the substrate 111, are accommodated in the accommodating portion 122Ab.

Each of the accommodating portions 122Ac and 122Ad is an example of a "first accommodating portion" recited in the claims. The accommodating portion 122Ac is a space extending linearly in the positive X-axis direction, from the center of the accommodating space 122A. The arm 121C3 of the actuator 121 extending linearly in the positive X-axis direction, as well as the switch 123c that is disposed under the arm 121C3 and on the substrate 111, are accommodated in the accommodating portion 122Ac.

The accommodating portion 122Ad is a space extending linearly in the negative X-axis direction, from the center of the accommodating space 122A. The arm 121C4 of the actuator 121 extending linearly in the negative X-axis direction, as well as the switch 123d that is disposed under the arm 121C4 and on the substrate 111, are accommodated in the accommodating portion 122Ad.

As illustrated in FIGS. 6A to 6C, a cross-shaped opening 122B for exposing, from the upper wall of the holder 122, the columnar portion 121A of the actuator 121 and a portion of each of the arms 121C1 to 121C2 of the actuator 121, is formed in the upper wall of the holder 122.

At each of the four corners, which is located at the middle portion of the opening 122B, of the holder 122 at the top thereof, a given curved portion 122E having a curved shape that conforms to the surface of the spherical portion 121B is formed. The rib 122D to be in sliding contact with the surface of the spherical portion 121B in accordance with the tilt of the actuator 121 is formed at each curved portion 122E.

(Switch Operation of Power Seat Switch 100)

Figure 7:
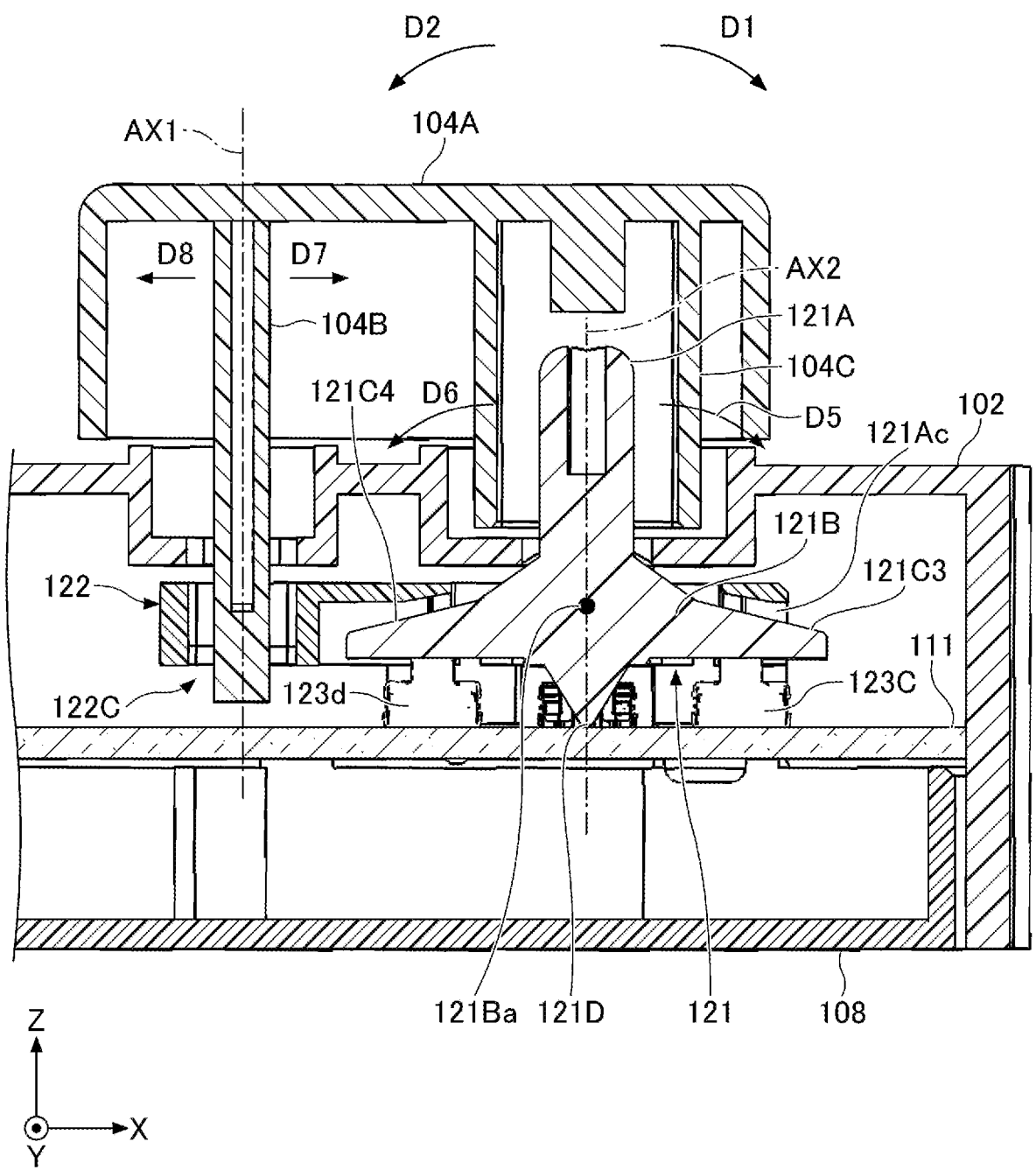
FIG. 7 is a cross-sectional view of the power seat switch taken along the A-A line illustrated in FIG. 1, the cross-sectional view being for describing the operation of each of a control knob and the actuator in a direction associated with a first direction.
Figure 8:
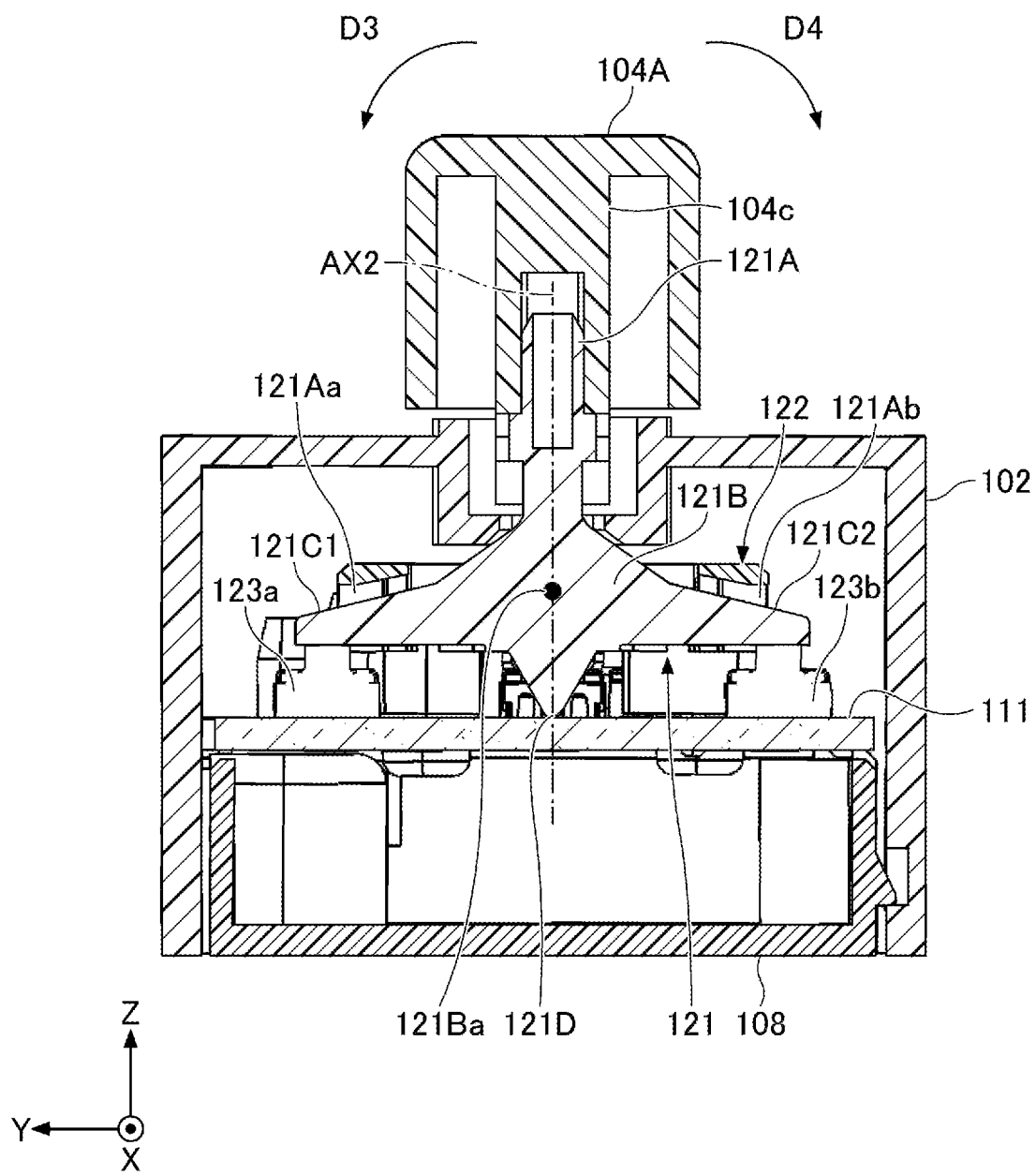
FIG. 8 is a cross-sectional view of the power seat switch taken along the B-B line illustrated in FIG. 1, the cross-sectional view being for describing the operation of each of the control knob and the actuator in a direction associated with a second direction.

FIG. 7 is a cross-sectional view of the power seat switch 100 taken along the A-A line illustrated in FIG. 1, as well as including a diagram for describing the operation of each of the control knob 104 and the actuator 121 in a direction associated with a first direction (cross-sectional view of the actuator 121 of which the cross section is taken along an XZ plane and passes through a central axis AX2 of the columnar portion 121A of the actuator 121). FIG. 8 is a cross-sectional view of the power seat switch 100 taken along the B-B line illustrated in FIG. 1, as well as including a diagram for describing the operation of each of the control knob 104 and the actuator 121 in a direction associated with a second direction (cross-sectional view of the actuator 121 of which the cross section is taken along a YZ plane and passes through the central axis AX2 of the columnar portion 121A of the actuator 121).

As illustrated in FIG. 7 and FIG. 8, in the actuator 121, the top of the columnar portion 121A is coupled to the coupling portion 104C of the control knob 104. Also, the actuator 121 has a sharpened lower end 121D at the lower end of the columnar portion 121A that passes through the central axis AX2. In a state in which the central axis AX2 of the actuator 121 disposed during non-manipulation is parallel to the vertical direction, the dimension of the lower end 121D is set such that a distance from the lower end 121D to the top surface of the substrate 111 is smaller than a stroke amount of each of the switches (123a to 123d). Thus, when the depression manipulation of the control knob 104 is performed, the lower end 121D of the actuator 121 contacts the top surface of the substrate 111 before the arms (121C1 to 121C4) turn on the respective switches (123a to 123d). With this arrangement, any switches of the switches 123a to 123d are prevented from being depressed simultaneously, and thus an erroneous input due to the simultaneous depression of the switches is obviated.

For example, when the slide manipulation of the control portion 104A in the positive X-axis direction is performed, the actuator 121 is tilted in the positive X-axis direction (direction D5 in FIG. 7, i.e., a circumferential direction of a concentric circle corresponding to the spherical portion 121B), where the center 121Ba of the spherical portion 121B serves as a fulcrum. With this arrangement, the actuator 121 can depress the switch 123c through the arm 121C3 that extends from the spherical portion 121B in the positive X-axis direction. When the slide manipulation of the control portion 104A in the positive X-axis direction is performed, movement of the control portion 104A is a movement in a circumferential direction (direction D1 in FIG. 7) of an ellipse, which is a combination of a movement, in a circumferential direction (direction D5 in FIG. 7) of a concentric circle corresponding to the spherical portion 121B, of a portion of the control portion 104A toward the positive X-axis and a linear movement, in the positive X-axis direction (direction D7 in FIG. 7), of a portion of the control portion 104A toward the negative X-axis.

When the slide manipulation of the control portion 104A in the negative X-axis direction is performed, the actuator 121 is tilted in the negative X-axis direction (direction D6 in FIG. 7, i.e., a circumferential direction of a concentric circle corresponding to the spherical portion 121B), where the center 121Ba of the spherical portion 121B serves as a fulcrum. With this arrangement, the actuator 121 can depress the switch 123d by the arm 121C4 that extends from the spherical portion 121B in the negative X-axis direction. When the slide manipulation of the control portion 104A in the negative X-axis direction is performed, movement of the control portion 104A is a movement in a circumferential direction (direction D2 in FIG. 7) of an ellipse, which is a combination of a movement, in a circumferential direction (direction D6 in FIG. 7) of a concentric circle corresponding to the spherical portion 121B, of a portion of the control portion 104A toward the positive X-axis and a linear movement, in the negative X-axis direction (direction D8 in FIG. 7), of a portion of the control portion 104A toward the negative X-axis.

When the rotation manipulation of the control portion 104A is performed in a clockwise direction (direction D3 illustrated in FIG. 1), which is viewed from above, the actuator 121 is tilted in the positive Y-axis direction (direction D3 in FIG. 8, i.e., a circumferential direction of a concentric circle corresponding to the spherical portion 121B), where the center 121Ba of the spherical portion 121B serves as a fulcrum. With this arrangement, the actuator 121 can depress the switch 123a through the arm 121C1 that extends from the spherical portion 121B in the positive Y-axis direction.

When the rotation manipulation of the control portion 104A is performed in an anticlockwise direction (direction D4 illustrated in FIG. 1), which is viewed from above, the actuator 121 is tilted in the negative Y-axis direction (direction D4 in FIG. 8, i.e., a circumferential direction of a concentric circle corresponding to the spherical portion 121B), where the center 121Ba of the spherical portion 121B serves as a fulcrum. With this arrangement, the actuator 121 can depress the switch 123b through the arm 121C2 that extends from the spherical portion 121B in the negative Y-axis direction.

Figure 9:
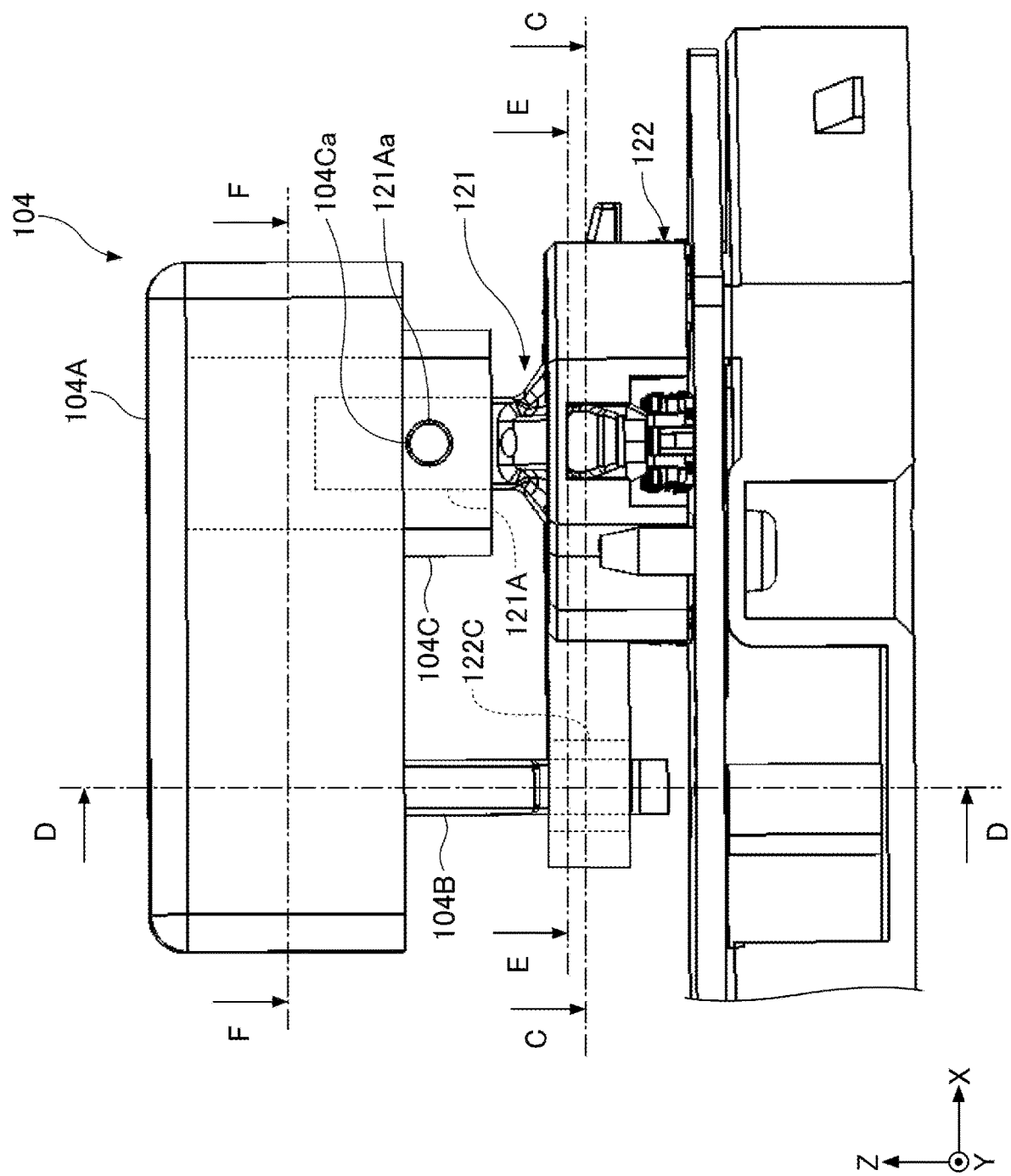
FIG. 9 is a diagram illustrating a state in which the control is attached to a switch module provided in the power seat switch according to one embodiment.
Figure 10:
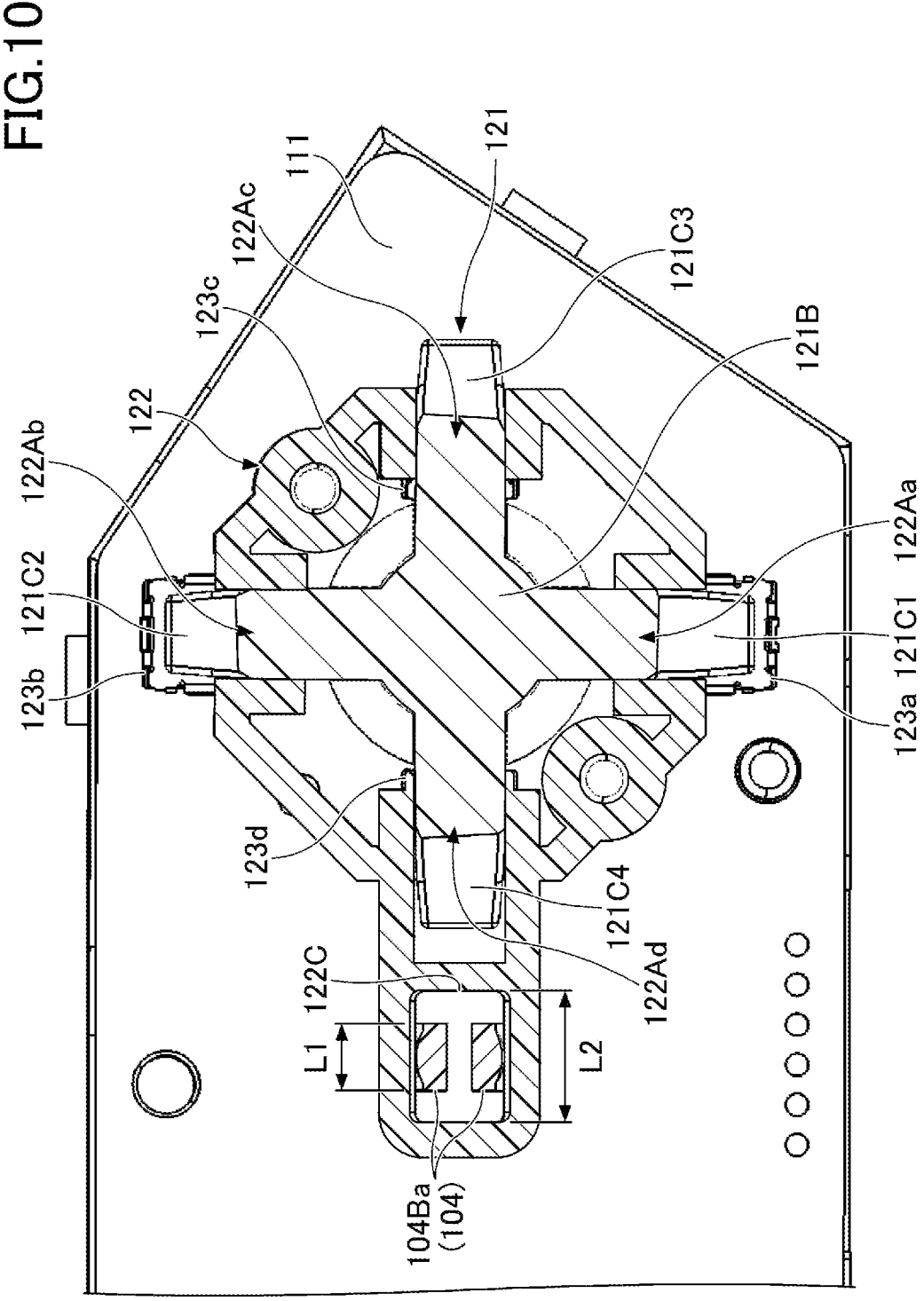
FIG. 10 is a cross-sectional view of a shaft and a shaft-receiving hole taken along the C-C line illustrated in FIG. 9.

FIG. 9 is a diagram illustrating a state in which the control knob 104 is attached to the switch module 120 provided in the power seat switch 100 according to one embodiment. In FIG. 9, illustration of the case 102 is omitted. FIG. 10 is a cross-sectional view of the shaft 104B and the shaft-receiving hole 122C taken along the C-C line illustrated in FIG. 9.

As illustrated in FIG. 9, in a state in which the distal end of the shaft 104B passes through the shaft-receiving hole 122C of the holder 122, the shaft 104B of the control knob 104 is fitted into the shaft-receiving hole 122C by a snap-fit structure. With this arrangement, the shaft 104B is pivotally supported at the shaft-receiving hole 122C so as to be rotatable.

Here, as illustrated in FIG. 10, the shaft-receiving hole 122C has an elongated hole shape that extends in the X-axis direction. The length L1 of the shaft 104B in the X-axis direction is smaller than the length L2 of the shaft-receiving hole 122C in the X-axis direction. With this arrangement, the shaft 104B can move in the X-axis direction, within the shaft-receiving hole 122C.

As illustrated in FIG. 9, in the coupling portion 104C of the control knob 104, the top of the columnar portion 121A of the actuator 121 is inserted into a lower opening of the coupling portion 104C, and further, the protrusions 121Aa that are cylindrical and protrude from both sides of the columnar portion 121A in the Y-axis direction are fitted into the shaft-receiving holes 104Ca that are circular and are formed at both sides of the coupling portion 104C in the Y-axis direction. With this arrangement, the coupling portion 104C is supported by the columnar portion 121A so as to be rotatable along the X-axis direction with respect to the columnar portion 121A. The protrusions 121Aa may be formed integrally with the columnar portion 121A, or a shaft that passes through the columnar portion 121A may be adopted.

By such a configuration, in the power seat switch 100 according to the present embodiment, when the slide manipulation of the control knob 104 in the X-axis direction is performed, and thus the actuator 121 is tilted in the X-axis direction, a pose difference (angle difference) between the columnar portion 121A and the coupling portion 104C is tolerable by rotating the coupling portion 104C with respect to the columnar portion 121A. With this arrangement, the power seat switch 100 according to the present embodiment can suppress occurrence of twisting of the actuator 121 and the control knob 104, due to the angle difference. Accordingly, the power seat switch 100 according to the present embodiment can provide a smooth and direct feel for switch operation, when the switch operation in the X-axis direction is performed through the control knob 104.

In the power seat switch 100 according to the present embodiment, twisting of the holder 122 and the control knob 104 can be suppressed during slide manipulation of the control knob 104 in the X-axis direction. Accordingly, the power seat switch 100 according to the present embodiment can provide a smooth and direct feel for switch operation, when the switch operation in the X-axis direction is performed through the control knob 104.

Further, in the power seat switch 100 according to the present embodiment, when the rotation manipulation of the control knob 104 is performed clockwise or counterclockwise, the columnar portion 121A of the actuator 121 tries to be linearly tilted in the positive Y-axis direction or the negative Y-axis direction, which is viewed from above. However, the coupling portion 104C of the control knob 104 tries to curvilinearly move clockwise or counterclockwise, on the circumference of a circle of which the center is the shaft 104B, which is viewed from above. For this reason, as the rotation angle of the control knob 104 increases, the positional difference between the columnar portion 121A and the coupling portion 104C is likely to occur. In contrast, in the power seat switch 100 according to the present embodiment, in response to the positional difference described above, the shaft 104B moves in shaft-receiving hole 122C, in the positive X-axis direction, and thus the positional difference between the columnar portion 121A and the coupling portion 104C is not avoided. With this arrangement, the power seat switch 100 according to the present embodiment can provide a smooth and direct manipulation feel for the rotation manipulation of the control knob 104, without occurrence of twisting of the control knob 104, the actuator 121, and the like.

In this description, as illustrated in FIG. 10, the width (width in a transverse direction) of each of the arms 121C1 to 121C4 is approximately the same as the width (width in the transverse direction) of each of the accommodating portions 122Aa to 122Ad. With this arrangement, a downward (which is an example of a "depression direction" recited in the claims) movement of each of the arms 121C1 to 121C4 is guided by the inner wall surface 122G of a given accommodating portion among the accommodating portions 122Aa to 122Ad, and translation of each of the arms 121C1 to 121C4 in a width direction is limited by the inner wall surface 122G of a given accommodating portion among the accommodating portions 122Aa to 122Ad. Thus, the depression operation of a given switch to move downward can be performed smoothly and directly without rattling.

(Cross-Sectional Configuration of Shaft 104B and Shaft-Receiving Hole 122C)

Figure 11:
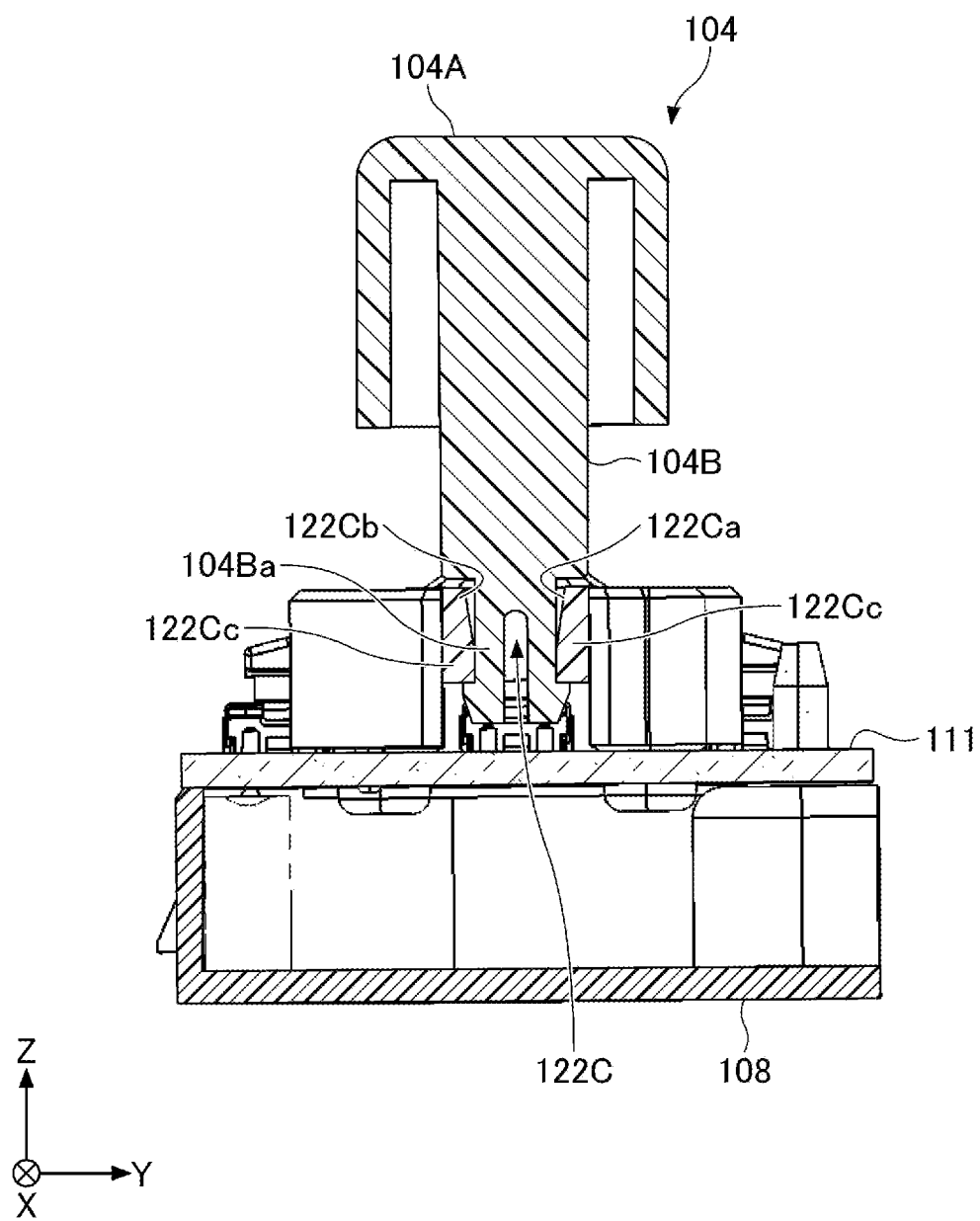
FIG. 11 is a cross-sectional view of the shaft and slopes at the shaft-receiving hole taken along the D-D line illustrated in FIG. 9.

FIG. 11 is a cross-sectional view of the shaft 104B and slopes at the shaft-receiving hole 122C taken along the D-D line illustrated in FIG. 9. As illustrated in FIG. 10 and FIG. 11, the shaft 104B of the control knob 104 includes a small diameter portion 104Ba, at a distal end of the shaft, where an outer diameter of the small diameter portion 104Ba is smaller than that of the shaft at the other portions other than the distal end. The small diameter portion 104Ba is in sliding contact with a wall 122Cc that constitutes the shaft-receiving hole 122C. By engagement of the small diameter portion 104Ba with the wall 122Cc, the small diameter portion 104Ba is pivotally supported at the shaft-receiving hole 122C so as not to easily fall from the shaft-receiving hole 122C.

The wall 122Cc at the shaft-receiving hole 122C toward the positive Y-axis has a slope 122Ca that is sloped so as to be gradually away from the shaft 104B in the positive Y-axis direction, toward the upper side of the wall. With this arrangement, the shaft 104B can be tilted toward the positive Y-axis until the side surface of the shaft 104B toward the positive Y-axis contacts the slope 122Ca.

Also, the wall 122Cc at the shaft-receiving hole 122C toward the negative Y-axis has a slope 122Cb that is sloped so as to be gradually away from the shaft 104B in the negative Y-axis direction, toward the upper side of the wall. With this arrangement, the shaft 104B can be tilted toward the negative Y-axis until the side surface of the shaft 104B toward the negative Y-axis contacts the slope 122Cb.

The power seat switch 100 according to the present embodiment employs a configuration in which the actuator 121 is constantly pressed into the holder 122 by a restoring force of a given switch among the switches 123a to 123d, in order to suppress the rattle in the actuator 121. In this case, in the power seat switch 100 according to the present embodiment, the twist between the actuator 121 and the holder 122 is likely to occur. Accordingly, in the power seat switch 100 according to the present embodiment, by providing tapered surfaces f3 (allowance portions) of each of the arms 121C1 to 121C4 of the actuator 121, the twist between the actuator 121 and the holder 122 can be prevented. With this arrangement, in the power seat switch 100 according to the present embodiment, occurrence of rattles in the actuator 121 can be reduced. In the power seat switch 100 according to the present embodiment, the restoring force of each of the switches 123a to 123d is directly transmitted to the control knob 104, thereby enabling a direct manipulation feel to be provided.

(Tilt Operation of Actuator 121)

Figure 12:
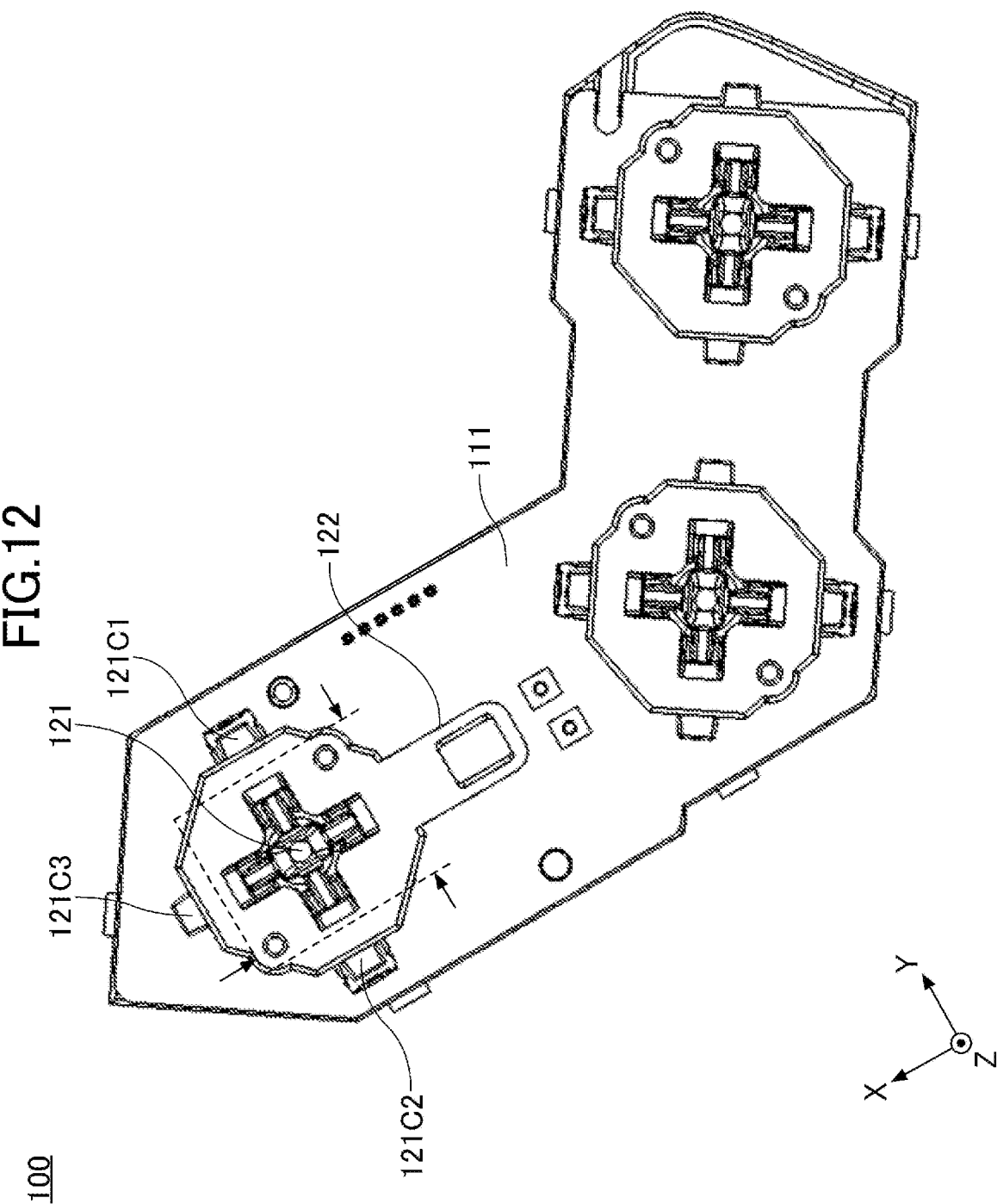
FIG. 12 is a plan view of the power seat switch according to one embodiment.

FIG. 12 is a plan view of the power seat switch 100 according to one embodiment. In FIG. 12, the power seat switch 100 is illustrated in a state in which the case 102, the control knob 104, and the control knob 106 are removed from the power seat switch.

FIG. 13 is a cross-sectional view of the arms arranged during non-manipulation of the actuator 121 illustrated in FIG. 12. FIG. 14 is a cross-sectional view of the arms that operate when the actuator 121 illustrated in FIG. 12 is tilted.

Figure 14A:
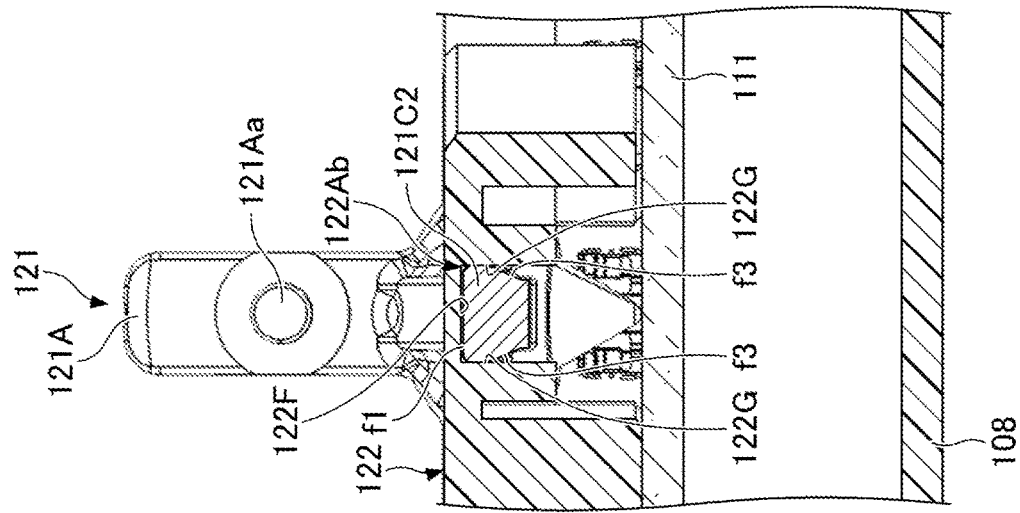
FIGS. 14A to 14C are cross-sectional views of the arms that operate when the actuator illustrated in FIG. 12 is tilted.

FIG. 13A and of FIG. 14A are cross-sectional views of the actuator 121 and the holder taken along a cross-sectional line (cross-sectional line that extends in the X-axis direction intersecting with the arm 121C1) of the power seat switch 100 illustrated in FIG. 12, as viewed from the positive Y-axis side of the actuator 121 and the holder.

Figure 14B:
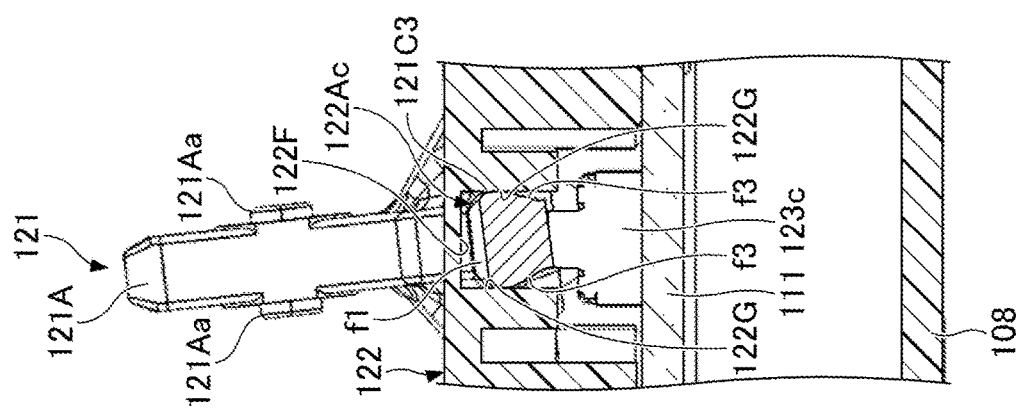

FIG. 13B and FIG. 14B are cross-sectional views of the actuator 121 and the holder taken along a cross-sectional line (cross-sectional line that extends in the Y-axis direction intersecting with the arm 121C3) of the power seat switch 100 illustrated in FIG. 12, as viewed from the positive X-axis side of the actuator 121 and the holder.

Figure 14C:
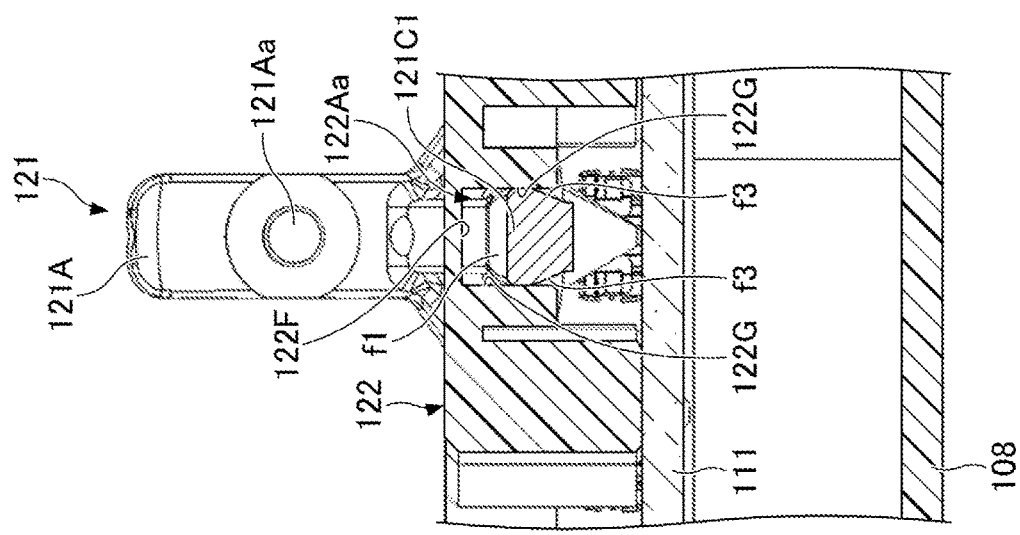

FIG. 13C and FIG. 14C are cross-sectional views of the actuator 121 and the holder taken along a cross-sectional line (cross-sectional line that extends in the X-axis direction intersecting with the arm 121C2) of the power seat switch 100 illustrated in FIG. 12, as viewed from the negative Y-axis side of the actuator 121 and the holder.

As illustrated in FIG. 13A and FIG. 14A, the arm 121C1 of the actuator 121 is accommodated in an accommodating portion 122Aa of the holder 122 at the accommodating space 122A.

As illustrated in FIG. 13B and FIG. 14B, the arm 121C3 of the actuator 121 is accommodated in an accommodating portion 122Ac of the holder 122 at the accommodating space 122A.

As illustrated in FIG. 13C and FIG. 14C, the arm 121C2 of the actuator 121 is accommodated in an accommodating portion 122Ab of the holder 122 at the accommodating space 122A.

As illustrated in FIGS. 13A to 13C and FIGS. 14A to 14C, a lateral width dimension of each of the arms 121C1 to 121C4 of the actuator 121 is approximately the same as that of a given accommodating portion among the accommodating portions 122Aa to 122Ad of the holder 122. With this arrangement, in the power seat switch 100 according to the present embodiment, a downward tilt of each of the arms 121C1 to 121C4 is guided by the inner wall surface 122G of a given accommodating portion among the accommodating portions 122Aa to 122Ad, and further, movement of each of the arms 121C1 to 121C4 in a lateral width direction is limited by the inner wall surface 122G of the given accommodating portion among the accommodating portions 122Aa to 122Ad. Therefore, a tilt operation (i.e., depression operation of each of the switches 123a to 123d) of the actuator 121 can be smoothly and directly performed without occurrence of rattling.

Also, as illustrated in FIGS. 13A to 13C, when the actuator 121 is not tilted, the arms 121C1 to 121C4 provided in the actuator 121 are respectively pushed upward by the switches 123a to 123d, so that these arms are located at the same height.

Moreover, as illustrated in FIGS. 14A to 14C, when the rotation manipulation of the control knob 104 is performed clockwise, which is viewed from above, and thus the actuator 121 is tilted in the positive Y-axis direction, the arm 121C1 extending from the spherical portion 121B in the positive Y-axis direction is tilted downward, within the accommodating portion 122Aa, as illustrated in FIG. 14A.

With this arrangement, the switch 123a is depressed by the arm 121C1 so that the switch 123a is turned on.

Also, as illustrated in FIG. 14C, the arm 121C2 extending from the spherical portion 121B in the negative Y-axis direction is tilted upward, within the accommodating portion 122Ab. At this time, the contact surface f1 formed at the top side of the arm 121C2 contacts the top (ceiling surface 122F) of the holder 122 to thereby limit a tilt angle of the actuator 121. In particular, the contact surface f1 is planar, and thus the holder 122 can be low-profile in comparison to a curved surface that protrudes upwardly.

As illustrated in FIG. 14B, the arm 121C3 extending from the spherical portion 121B in the positive X-axis direction is tilted toward the positive Y-axis, within the accommodating portion 122Ac. At this time, the arm 121C3 slightly depresses the switch 123a at a bottom surface of the arm, to an extent to which the switch 123a is not be turned on.

As illustrated in FIG. 13B and FIG. 14B, at each of a positive Y-axis side-portion and a negative Y-axis side-portion of the arm 121C3, the tapered surface f3 to allow for the tilt of the actuator 121 in the Y-axis direction is provided such that the arm is gradually away from the inner wall surface 122G of the accommodating portion 122Ac (i.e., so as to narrow the lateral width of the arm 121C3), toward the lower side of the arm.

With this arrangement, in the power seat switch 100 according to the present embodiment, when the columnar portion 121A of the actuator 121 is tilted in the Y-axis direction, by the rotation manipulation of the control knob 104, the arm 121C3 can be tilted in the Y-axis direction, together with the columnar portion 121A, until the tapered surface f3 contacts the inner wall surface 122G of the accommodating portion 122Ac.

Therefore, in the power seat switch 100 according to the present embodiment, the entire actuator 121 can be in the Y-axis direction such that the twist between the columnar portion 121A and the arm 121C3 does not occur. Therefore, a smooth and direct feel for switch operation can be provided to the user.

The four arms 121C1, 121C2, 121C3, and 121C4 that are provided in the switch module 120 have the same configuration, and the four accommodating portions 122Aa, 122Ab, 122Ac, and 122Ad that are provided in the switch module 120 have the same cross-sectional configuration. That is, the same tapered surfaces f3 are formed in each of the arms 121C1, 121C2, 121C3, and 121C4.

Therefore, in the power seat switch 100 according to the present embodiment, when the columnar portion 121A of the actuator 121 is tilted in the X-axis direction, by the slide manipulation of the control knob 104, each of the arms 121C1 and 121C2 can be tilted in the X-axis direction, together with the columnar portion 121A, until the tapered surface f3 of a given arm, among the arms 121C1 and 121C2, that extends in the Y-axis direction, contacts the inner wall surface 122G of a given accommodating portion among the accommodating portion 122Aa and the accommodating portion 122Ab.

Therefore, in the power seat switch 100 of the present embodiment, by constantly pressing the actuator 121 into the actuator 122 through a given restoring force of a given switch among the switches 123a to 123d, the whole actuator 121 can be tilted in the X-axis direction such that the twist between the columnar portion 121A and the arm 121C3 does not occur, while suppressing occurrence of rattling in the actuator 121. With this arrangement, the twist between the actuator 121 and the holder 122 can be prevented, thereby enabling a smooth and direct feel for switch operation to be provided.

(Cross-Sectional Configuration of Coupling Portion 104C)

FIG. 15 is a cross-sectional view of the switch module 120 taken along the F-F line illustrated in FIG. 9. As illustrated in FIG. 15, the coupling portion 104C of the control knob 104 is rectangular cylindrical. The rectangular cylindrical columnar portion 121A of the actuator 121 is inserted into the lower opening of the coupling portion 104C, and further, the respective cylindrical protrusions 121Aa protruding from both side surfaces of the columnar portion 121A in the Y-axis direction are fitted into the circular shaft-receiving holes 104Ca that are formed at both side walls of the coupling portion 104C in the Y-axis direction. With this arrangement, the coupling portion 104C is supported by the columnar portion 121A, so as to be rotatable along the X-axis direction with respect to the columnar portion 121A.

As illustrated in FIG. 15, the width of the columnar portion 121A in the Y-axis direction is approximately the same as the width of the interior of the cylindrical coupling portion 104C in the Y-axis direction. With this arrangement, rattling between the columnar portion 121A and the coupling portion 104C in the Y-axis direction is unlikely to occur. Thus, in the power seat switch 100 according to the present embodiment, when the rotation manipulation of the control knob 104 is performed, and thus the actuator 121 is tilted in the positive Y-axis direction or the negative Y-axis direction so that the switch 123a or the switch 123b is depressed, a sensation of directly operating the switch can be provided to the user.

As illustrated in FIG. 15, the width of the columnar portion 121A in the X-axis direction is smaller than the width of an interior of the cylindrical coupling portion 104C in the X-axis direction. With this arrangement, the columnar portion 121A is rotatable in the X-axis direction in the interior of the cylindrical coupling portion 104C, where the protrusions 121Aa are serves as a rotation axis. Thus, in the power seat switch 100 according to the present embodiment, when the slide manipulation of the control knob 104 in the X-axis direction is performed, and thus the actuator 121 is tilted in the positive X-axis direction or the negative X-axis direction so that the switch 123c or the switch 123d is depressed, a given angle difference occurring between the coupling portion 104C and the columnar portion 121A becomes tolerable. Therefore, a smooth and direct feel for switch operation can be provided to the user.

(Configuration of Rotatable Actuator 121)

Figure 16:
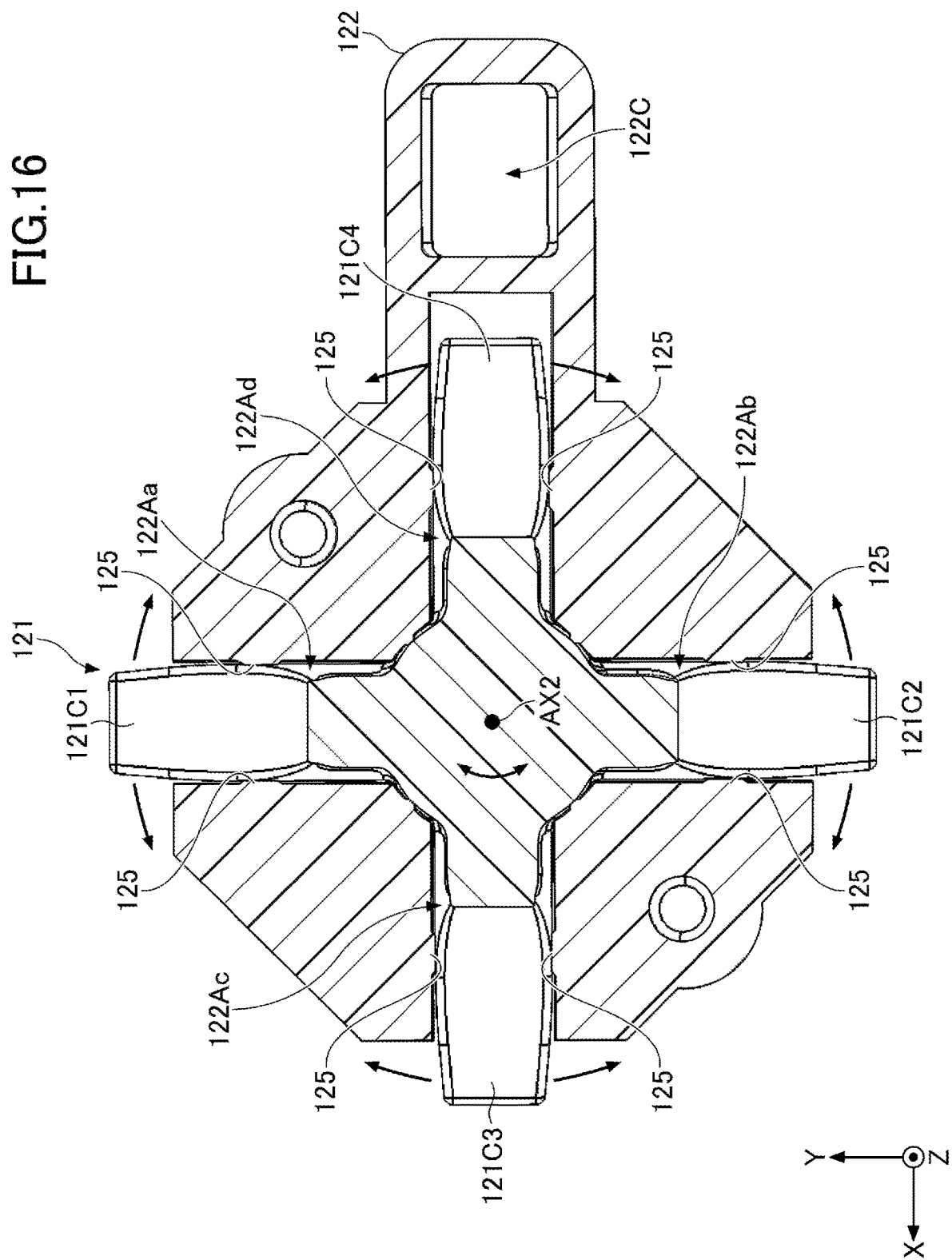
FIG. 16 is a cross-sectional view of the actuator and holder taken along the E-E line illustrated in FIG. 9.
Figure 17:
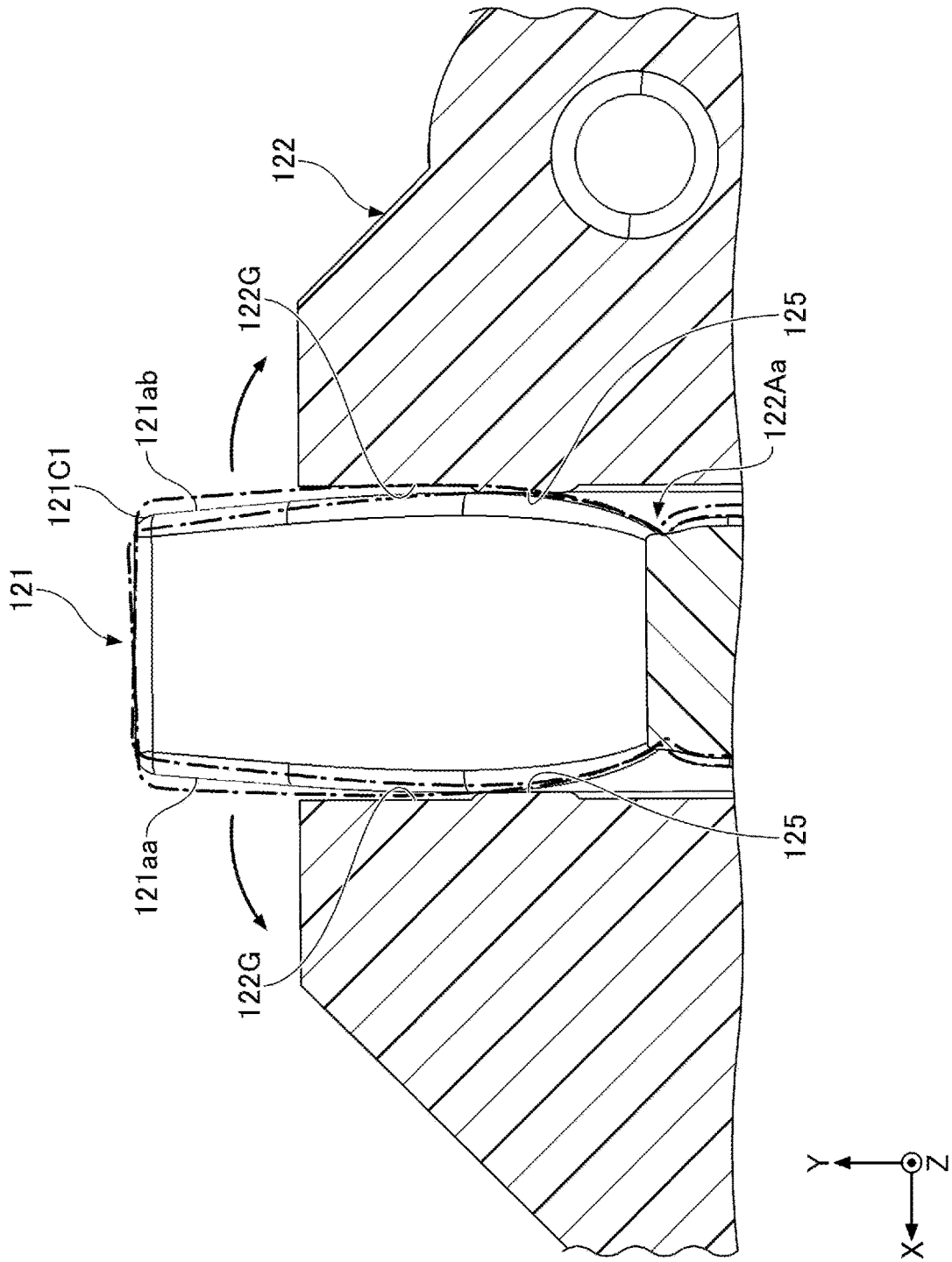
FIG. 17 is a partially enlarged view of the arm and accommodating portion illustrated in FIG. 16.

FIG. 16 is a cross-sectional view of the actuator 121 and the holder 122 taken along the E-E line illustrated in FIG. 9. FIG. 17 is a partially enlarged view of the arm 121C1 and the accommodating portion 122Aa illustrated in FIG. 16.

As illustrated in FIG. 17, both the arm 121C1 of the actuator 121 and the accommodating portion 122Aa of the holder 122 extend in the positive Y-axis direction, and the arm 121C1 is held in a state of being accommodated in the accommodating portion 122Aa.

Each of a side surface 122aa of the arm 121C1 toward the positive X-axis and a side surface 122ab of the arm 121C1 toward the negative X-axis is a curved surface that is curved so as to protrude outwardly in the X-axis direction. Further, each surface in a pair of inner wall surfaces 122G of the accommodating portions 122Aa is a plane extending in the Y-axis direction, and includes a limiting portion 125 curving toward the arm 121C1 in the X-axis direction.

At the middle portion of each side surface 122ab and 122ab of the arm 121C1, a given limiting portion 125 is in point contact with a given side surface of the arm, and a space is provided between the other portion of the given side surface and the inner wall surface 122G. With this arrangement, translation of the arm 121C1 in the X-axis direction is limited by each limiting portion 125, and the arm 121C1 is rotatable clockwise and counterclockwise in a plan view from above, as expressed by the arrows in FIG. 17.

As illustrated in FIG. 16, three other arms 121C2, 121C3, and 121C4 that are provided in the switch module 120, as well as three other accommodating portions 122Ab, 122Ac, and 122Ad that are provided in the switch module 120, are configured as in the configuration described in FIG. 17. That is, both side surfaces of each of the arms 121C2, 121C3, and 121C4 are respective curved surfaces, and the limiting portion 125 is provided at each inner wall surface in a pair of inner wall surfaces 122G of a given accommodating portion among the accommodating portions 122Ab, 122Ac, and 122Ad. Each of the arms 121C2, 121C3, and 121C4 is rotatable clockwise and counterclockwise, in a plan view from above.

With this arrangement, in the power seat switch 100 according to the present embodiment, when a rotating moment on the actuator 121 in a clockwise direction or counterclockwise direction is created through the rotation manipulation of the control knob 104, such a rotating moment can be escaped by the actuator 121 rotating clockwise or counterclockwise, where the central axis AX2 of the columnar portion 121A acts as a rotation axis. Thus, in the power seat switch 100 according to the present embodiment, the twist of the actuator 121 is unlikely to occur when the rotation manipulation of the control knob 104 is performed. Therefore, the power seat switch 100 can provide a smooth and direct feel for switch operation to the user.

As described above, the power seat switch 100 according to one embodiment employs a configuration in which the actuator 121 is constantly pressed into the holder 122 by a restoring force of a given switch among the switches 123a to 123d. Therefore, the power seat switch 100 according to one embodiment can suppress occurrence of rattling in the actuator 121. The power seat switch 100 according to the present embodiment can also provide a direct manipulation feel because the restoring force of each of the switches 123a to 123d is directly transmitted to the control knob 104.

In the power seat switch 100 according to one embodiment, each of first arms 121C3 and 121C4 has tapered surfaces f3 (allowance portions) that allow for the tilt of the actuator 121 in the Y-axis direction, without interfering with a corresponding first accommodating portion among first accommodating portions 122Ac and 122Ad. Likewise, each of second arms 121C1 and 121C2 has tapered surfaces f3 (allowance portions) that allow for the tilt of the actuator 121 in the X-axis direction, without interfering with a corresponding second accommodating portion among second accommodating portions 122Aa and 122Ab.

With this arrangement, in the power seat switch 100 according to one embodiment, when the actuator 121 is tilted in the Y-axis direction by the rotation manipulation of the control knob 104, each of the arms 121C3 and 121C4 can be tilted in the Y-axis direction, without interfering with a corresponding accommodating portion among the accommodating portions 122Ac and 122Ad. Likewise, in the power seat switch 100 according to one embodiment, when the actuator 121 is tilted in the X-axis direction by the rotation manipulation of the control knob 104, each of the arms 121C1 and 121C2 can be tilted in the X-axis direction, without interfering with a corresponding accommodating portion among the accommodating portions 122Aa and 122Ab. Accordingly, in the power seat switch 100 according to one embodiment, the twist between the actuator 121 and the holder 122 can be prevented, thereby providing a smooth and direct manipulation feel.

In the power seat switch 100 according to one embodiment, each of the arms 121C1, 121C2, 121C3, and 121C4 includes a contact surface f1, sliding curved surfaces f2, and tapered surfaces f3.

With this arrangement, in the power seat switch 100 according to one embodiment, each of the arms 121C1, 121C2, 121C3, and 121C4 can limit the tilt angle of the actuator 121, thorough a given contact surface f1. Each of the arms 121C1, 121C2, 121C3, and 121C4, at a given sliding curved surface f2, can be in sliding contact with the inner wall surface 122G of a given accommodating portion among the accommodating portions (122Aa to 122Ad) of the holder 122. Further, tilting of the actuator 121 can be allowable by each tapered surface f3.

In particular, in the power seat switch 100 according to one embodiment, the cross-sectional shape of each of the arms 121C1, 121C2, 121C3, and 121C4 is a minimum trapezoidal shape corresponding to the contact surface f1, the sliding curved surfaces f2, and the tapered surfaces f3.

With this arrangement, in the power seat switch 100 according to one embodiment, the holder 122 can be low-profile because extra portions including a contact surface f1, sliding curved surfaces f2, and tapered surfaces f3 are removed.

In the power seat switch 100 according to one embodiment, the control knob 104 further has the shaft-receiving hole 122C that pivotally supports the shaft 104B is pivotally supported so as to be rotatable. The shaft 104B can slide in the X-axis direction, within the shaft-receiving hole 122C.

With this arrangement, in the power seat switch 100 according to one embodiment, twisting of the holder 122 and the control knob 104 can be suppressed during the slide manipulation of the control knob 104. Thus, a smooth and direct manipulation feel can be provided.

Further, in the power seat switch 100 according to one embodiment, when the actuator 121 is tilted in the Y-axis direction, by the rotation manipulation of the control knob 104, a smooth and direct manipulation feel can be provided, because the control knob 104 can be moved in the X-axis direction, together with the shaft 104B.

Also, in the power seat switch 100 according to one embodiment, the inner wall surface of the shaft-receiving hole 122C has slopes 122Ca and 122Cb that are each sloped in the Y-axis direction and allow for the tilt of the shaft 104B in the Y-axis direction.

With this arrangement, in the power seat switch 100 according to one embodiment, when the actuator 121 is tilted in the Y-axis direction, by the rotation manipulation of the control knob 104, the control knob 104 can be tilted in the Y-axis direction, together with the shaft 104B. Thus, a smooth and direct manipulation feel can be provided.

In the power seat switch 100 according to one embodiment, the shaft-receiving hole 122C is integrally formed in the holder 122.

With this arrangement, the power seat switch 100 according to one embodiment, the relative positional relationship between the actuator 121 and the shaft-receiving hole 122C can be maintained constant as designed, regardless of errors in installation of the holder 122 with respect to the substrate 111. Thus, operating of the control knob 104 that is interposed between the actuator 121 and the shaft-receiving hole 122C is enabled as designed, with high accuracy.

In the power seat switch 100 according to one embodiment, the columnar portion 121A is coupled to the coupling portion 104C such that the movement of the columnar portion in the Y-axis direction is limited and the columnar portion is rotatable in the X-axis direction.

With this arrangement, in the power seat switch 100 according to one embodiment, when the actuator 121 is tilted in the Y-axis direction, by the rotation manipulation of the control knob 104, rattling between the columnar portion 121A and the coupling portion 104C can be unlikely to occur. Thus, a smooth and direct manipulation feel can be provided.

In the power seat switch 100 according to one embodiment, when the actuator 121 is tilted in the X-axis direction by the slide manipulation of the control knob 104, an angle difference between the columnar portion 121A and the coupling portion 104C is tolerable. Thus, a smooth and direct manipulation feel can be provided.

Although one or more embodiments of the present disclosure has been described above in detail, the present disclosure is not limited to these embodiments. Various modifications or changes can be made within the scope of the present disclosure set forth in the claims.

For example, in the embodiments described above, the shaft 104B of the control knob 104 may be resiliently deformable. In this case, a surface of the shaft-receiving hole 122C may not include slopes 122Ca and 122Cb. This is because the shaft 104B is elastically deformed and thus tilting of the control knob 104 in the Y-axis direction is allowable.

In the embodiments described above, slopes that allow for the tilt of the actuator 121 are provided at the respective side surfaces of each of the arms 121C1 to 121C4. However, the manner described above is not limiting. The respective slopes may be provided at the inner wall surfaces 122G of each of the accommodating portions 122Aa to 122Ad.

Although the embodiments are described using an example in which the present disclosure is applied to the power seat switch for a vehicle, the present disclosure is applicable to any switch device.

The above embodiments have been described using an example in which the present disclosure is applied to a switch device including an actuator that can be tilted in both of two directions (in the X-axis direction and the Y-axis direction) perpendicular to each other. However, the example described above is not limiting. For example, the present disclosure is also applicable to a switch device including an actuator that can be tilted in only one of two directions perpendicular to each other.

The embodiments have been described using an example in which the disclosure is applied to a switch device including an actuator that can be tilted in both of two directions (positive direction and negative direction) opposite to each other. However, the example described above is not limiting. For example, the present disclosure is also applicable to a switch device including an actuator that can be tilted in only one of two directions opposite to each other.

What is claimed is:

1. An operating device comprising:
    a control knob provided extending in a first direction, a first side of the control knob in the first direction being pivotally supported to be rotatable about a shaft that protrudes substantially perpendicular to the control knob, and a second side of the control knob in the first direction being rotatable;
    an actuator including a spherical portion, wherein rotation of the control knob causes the actuator to tilt in a second direction perpendicular to the first direction, such that the center of the spherical portion serves as a fulcrum, and sliding of the control knob in the first direction causing the actuator to tilt in the first direction, such that the center of the spherical portion serves as the fulcrum;
    a first switch configured to be depressed in accordance with the tilting of the actuator in the first direction;
    a second switch configured to be depressed in accordance with the tilting of the actuator in the second direction; and
    a holder having an accommodating space defined by the outer periphery of the actuator, the holder holding the actuator within the accommodation space,
    wherein the actuator includes
        a first arm extending from the spherical portion in the first direction, the first arm being configured to depress the first switch in accordance with the tilting of the actuator in the first direction,
        a second arm extending from the spherical portion in the second direction, the second arm being configured to depress the second switch in accordance with the tilting of the actuator in the second direction, and
        a columnar portion protruding from the spherical portion in a third direction perpendicular to each of the first direction and the second direction,
    wherein the accommodating space of the holder is defined by
        a first accommodating portion extending in the first direction, the first arm being accommodated in the first accommodating portion, and the first accommodating portion being configured to guide the first arm in a depression direction of the first switch, and
        a second accommodating portion extending in the second direction, the second arm being accommodated in the second accommodating portion, and the second accommodating portion being configured to guide the second arm in a depression direction of the second switch,
    wherein the first arm or the first accommodating portion includes an allowance portion that allows the tilting of the actuator in the second direction, without interference between the first arm and the first accommodating portion, and
    wherein the second arm or the second accommodating portion includes an allowance portion that allows the tilting of the actuator in the first direction, without interference between the second arm and the second accommodating portion.

2. The operating device according to claim 1, wherein a cross-sectional shape of each of the first arm and the second arm is a trapezoid.

3. The operating device according to claim 1, wherein the operating device further includes a shaft-receiving hole that pivotally supports the shaft to be rotatable, and
    wherein the shaft is slidable in the first direction within the shaft-receiving hole.

4. The operating device according to claim 3, wherein an inner wall surface of the shaft-receiving hole includes a slope that is sloped in the second direction and allows for a tilt of the shaft in the second direction.

5. The operating device according to claim 3, wherein the shaft is elastically deformable.

6. The operating device according to claim 3, wherein the shaft-receiving hole is integrally formed in the holder.

7. The operating device according to claim 1, wherein the columnar portion is coupled to the control knob such that movement of the control knob in the second direction is limited and the control knob is rotatable in the first direction.

8. The operating device according to claim 1, wherein the actuator includes
- a space between a side surface of the first arm and an inner wall surface of a first accommodating portion, and
- a space between a side surface of the second arm and an inner wall surface of a second accommodating portion, and the actuator is rotatable about a central axis of the columnar portion as a rotation axis, within the accommodating space.

* * * * *